US012003801B2

(12) United States Patent
Shibata

(10) Patent No.: US 12,003,801 B2
(45) Date of Patent: Jun. 4, 2024

(54) SYSTEM, METHOD, AND COMPUTER-READABLE MEDIUM INCLUDING PROGRAM FOR DISTRIBUTING LIVE VIDEO

(71) Applicant: DeNA Co., Ltd., Tokyo (JP)

(72) Inventor: Kazuto Shibata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 148 days.

(21) Appl. No.: 17/575,959

(22) Filed: Jan. 14, 2022

(65) Prior Publication Data

US 2022/0141516 A1 May 5, 2022

Related U.S. Application Data

(63) Continuation of application No. PCT/JP2020/019767, filed on May 19, 2020.

(30) Foreign Application Priority Data

Jul. 16, 2019 (JP) .................................. 2019-131506

(51) Int. Cl.
*G06F 15/16* (2006.01)
*G06F 16/78* (2019.01)
(Continued)

(52) U.S. Cl.
CPC ......... *H04N 21/278* (2013.01); *G06F 16/783* (2019.01); *G06F 16/7867* (2019.01); *H04N 21/2187* (2013.01); *H04N 21/2743* (2013.01)

(58) Field of Classification Search
CPC ............. H04N 21/278; H04N 21/2187; H04N 21/2743; G06F 16/783; G06F 16/7867
(Continued)

(56) References Cited

U.S. PATENT DOCUMENTS 7,987,271 B1 * 7/2011 O'Toole, Jr. ........... G06Q 30/02
 709/227
8,332,424 B2 * 12/2012 Flynn .................... G06F 16/583
 707/769
(Continued)

FOREIGN PATENT DOCUMENTS

JP H10-49515 A 2/1998
JP 2010-183504 A 8/2010
(Continued)

OTHER PUBLICATIONS

Non-Final Office Action issued in counterpart Japanese Application No. 2022-034640; dated Jun. 8, 2023 (10 pages) with English translation.
(Continued)

*Primary Examiner* — Moustafa M Meky
(74) *Attorney, Agent, or Firm* — Osha Bergman Watanabe & Burton LLP

(57) ABSTRACT

A video distribution server according to an embodiment of the present invention promotes the viewing of live videos. The server is communicably connected to a user terminal via a communication network and provides a live video distribution service for distributing and viewing a live video to the user via the user terminal. The server associates (adds) the tag input by the user who is viewing a live video with this live video and presents information on the live video being distributed based on the associated tag. Therefore, the user can know the current content (topic) of the live video being distributed from the information based on the tag input by the actual viewer. As a result, for example, a new user can comfortably start viewing the live video.

18 Claims, 20 Drawing Sheets

(51) Int. Cl.
*G06F 16/783* (2019.01)
*H04N 21/2187* (2011.01)
*H04N 21/2743* (2011.01)
*H04N 21/278* (2011.01)

(58) Field of Classification Search
USPC .......................................................... 709/219
See application file for complete search history.

(56) References Cited

U.S. PATENT DOCUMENTS

| | | | | |
|---|---|---|---|---|
| 8,661,053 | B2* | 2/2014 | Flynn | G06F 16/51 |
| | | | | 707/769 |
| 9,407,975 | B2* | 8/2016 | Grusd | H04N 21/8583 |
| 9,877,084 | B2* | 1/2018 | Hao | H04N 21/435 |
| 10,299,011 | B2* | 5/2019 | Grusd | H04N 21/4858 |
| 11,114,129 | B2* | 9/2021 | Nakatsuka | H04N 21/472 |
| 2012/0290591 | A1* | 11/2012 | Flynn | G06F 16/5866 |
| | | | | 707/754 |
| 2013/0093832 | A1* | 4/2013 | Konda | H04N 7/155 |
| | | | | 348/E7.083 |
| 2013/0216201 | A1* | 8/2013 | Seligmann | H04N 5/783 |
| | | | | 386/E5.003 |
| 2014/0019863 | A1* | 1/2014 | Callanan | G06F 3/0484 |
| | | | | 715/720 |
| 2014/0033038 | A1* | 1/2014 | Callanan | H04N 21/8455 |
| | | | | 715/719 |
| 2015/0012946 | A1* | 1/2015 | Woods | H04N 21/84 |
| | | | | 725/40 |
| 2016/0234568 | A1* | 8/2016 | Grusd | H04N 21/2668 |
| 2017/0171335 | A1* | 6/2017 | Ao | H04L 67/34 |
| 2019/0130185 | A1* | 5/2019 | Delaney | G06V 20/62 |
| 2020/0082849 | A1* | 3/2020 | Nakatsuka | G11B 27/34 |
| 2021/0375323 | A1* | 12/2021 | Nakatsuka | H04N 5/92 |

FOREIGN PATENT DOCUMENTS

| | | |
|---|---|---|
| JP | 2012-109795 A | 6/2012 |
| JP | 2012-129982 A | 7/2012 |
| JP | 2013-12955 A | 1/2013 |
| JP | 2017-199352 A | 11/2017 |
| JP | 2017-220067 A | 12/2017 |
| JP | 2019-022219 A | 2/2019 |
| JP | 2019-97768 A | 6/2019 |

OTHER PUBLICATIONS

Non-Final Office Action issued in corresponding Japanese Patent Application No. 2019-131506, mailed on Feb. 12, 2020 (9 pages).
Shima et al., Nico Nico Live Pocket Guide, Mainichi Communications Co., Ltd., Nov. 15, 2010, First Edition, p. 24-25, 49-50 (14 pages).
Ito et al., All of the complete preservation version of Nico Nico Douga, Weekly ASCII, ASCII Media Works Co., Ltd., Apr. 25, 2011, vol. 23, vol. 831, p. 7 (13 pages).
Final Office Action issued in corresponding Japanese Patent Application No. 2019-131506, mailed on Jul. 14, 2020 (10 pages).
Non-Final Office Action issued in corresponding Japanese Patent Application No. 2020-169493, mailed on Jan. 12, 2021 (11 pages).
Book for watching Youtube and Nico Nico Douga as DVD and Blu-ray on TV, Sansai Co., Ltd., Dec. 31, 2015, First Edition, p. 11 (11 pages).
Non-Final Office Action issued in corresponding Japanese Patent Application No. 2021-085307, mailed on Oct. 12, 2021 (10 pages).
S. Tokie, "First Facebook Introduction (Latest Edition)", Japan, Shuwa System Saito Co., Ltd., Feb. 1, 2016, p. 92. (10 pages).
International Search Report issued in corresponding International Application No. PCT/JP2020/019767, mailed on Jul. 21, 2020 (5 pages).
Notice of Reasons for Refusal issued in corresponding Japanese Patent Application No. 2023-140352, dated Oct. 17, 2023, (25 pages).

* cited by examiner

USER INFORMATION TABLE 411

| USER ACCOUNT |
|---|
| BASIC INFORMATION |
| DISTRIBUTION HISTORY INFORMATION |
| VIEWING HISTORY INFORMATION |
| FOLLOWING USER INFORMATION |
| FOLLOWER INFORMATION |
| FAMILY INFORMATION |
| RANK |
| RANK METER VALUE |
| NUMBER OF HOLDING COINS |
| NUMBER OF HOLDING DIAMONDS |
| TAG POINT INFORMATION |
| TAG INFORMATION |
| CLASSIFICATION TEXT |
| ... |

FIG. 3

| RANK BAND | S | | | A | | | B | | | C | | | D | | | E |
|---|---|---|---|---|---|---|---|---|---|---|---|---|---|---|---|---|
| RANK | S+ | S | S- | A+ | A | A- | B+ | B | B- | C+ | C | C- | D+ | D | D- | E |

FIG. 4

DISTRIBUTION MANAGEMENT TABLE 412

| |
|---|
| DISTRIBUTION ID |
| DISTRIBUTOR USER ACCOUNT |
| DISTRIBUTION DATE AND TIME |
| DISTRIBUTION TIME |
| NUMBER OF VIEWERS (CURRENT VALUE AND MAXIMUM VALUE) |
| NUMBER OF COINS |
| NUMBER OF LIKES |
| ITEM POINTS |
| DISTRIBUTION POINTS |
| ... |

FIG. 5

TAG MANAGEMENT TABLE 413

| DISTRIBUTION ID |
| --- |
| TAG ID |
| INPUTTER USER ACCOUNT |
| TAG CONTENT |
| ADDED DATE AND TIME |
| ... |

FIG. 6

| RANKING OF NUMBER OF DISTRIBUTION POINTS IN RANK BAND ON PREVIOUS DAY | VARIATION OF RANK METER VALUE |
|---|---|
| TOP 10% | +2 |
| TOP 11 TO 30% (REMAINING 20% EXCLUDING TOP 10% TO 30%) | +1 |
| MIDDLE 30% | ±0 |
| LOWER 40% | -1 |
| ※NO DISTRIBUTION ON THAT DAY | -1 |

FIG. 17

| UPDATED CONTENT OF RANK | REQUIRED RANK METER VALUE |
|---|---|
| INCREASE RANK ACROSS RANK BANDS | +4 |
| INCREASE RANK IN SAME RANK BAND | +2 |
| DECREASE RANK IN SAME RANK BAND | -2 |
| INCREASE RANK ACROSS RANK BANDS | -6 |

FIG. 18

SYSTEM, METHOD, AND COMPUTER-READABLE MEDIUM INCLUDING PROGRAM FOR DISTRIBUTING LIVE VIDEO

CROSS-REFERENCE TO RELATED APPLICATIONS

The present application is a continuation of the international application No. PCT/JP2020/019767, filed on May 19, 2020, the content of which is incorporated herein in its entirety by reference.

TECHNICAL FIELD

The present invention relates to a system, a method, and a computer-readable medium including a program for distributing a live video.

BACKGROUND

Conventionally, various services for distributing live videos have been provided (see, for example, Japanese Patent Application Laid-Open No. 2019-022219). In such services, users including ordinary people can distribute live videos as distributors and provide viewers with live videos of various topics.

However, in the conventional live video distribution services, a viewer cannot understand the current content (topic) unless viewing a live video. This is not a great problem for regular viewers but can make it difficult for new users to start casual viewing of live videos. If it is difficult to acquire new viewers, the distributor's motivation to distribute live videos will decrease, which will hinder the service's success.

One of the objects of the embodiment of the present invention is to promote the viewing of live videos. Other objects of the embodiments of the present invention will become apparent by reference to the entire specification.

SUMMARY

The system according to an embodiment of the present invention is a system including one or more computer processors. The one or more computer processors execute machine-readable instructions to perform presenting information on at least one of a plurality of live videos being distributed to a user; and managing association of tags with the plurality of live videos. In the system, the managing of the association includes associating a first tag input by a first user viewing a first live video with the first live video; and the presenting includes presenting the information based on at least one of a plurality of tags associated with the plurality of live videos.

A method according to an embodiment of the present invention is a method executed by one or more computers. The method includes presenting information on at least one of a plurality of live videos being distributed to a user; and managing association of tags with the plurality of live videos. In the method, the managing of the association includes associating a first tag input by a first user viewing a first live video with the first live video; and the presenting includes presenting the information based on at least one of a plurality of tags associated with the plurality of live videos.

A non-transitory computer-readable medium according to an embodiment of the present invention includes a program. The program causes one or more computers to execute presenting information on at least one of a plurality of live videos being distributed to a user; and managing association of tags with the plurality of live videos. In the program, the managing of the association includes associating a first tag input by a first user viewing a first live video with the first live video; and the presenting includes presenting the information based on at least one of a plurality of tags associated with the plurality of live videos.

Various embodiments of the present invention can promote the viewing of live videos.

BRIEF DESCRIPTION OF THE DRAWINGS

FIG. 3 is a diagram illustrating information managed in a user information table 411.

FIG. 4 is a diagram for explaining the rank.

FIG. 5 is a diagram illustrating information managed in a distribution management table 412.

FIG. 6 is a diagram illustrating information managed in a tag management table 413.

FIG. 17 is a diagram for explaining the update rule of the rank meter value.

FIG. 18 is a diagram for explaining the correspondence between the updated content of the rank and the required rank meter value.

DETAILED DESCRIPTION

Hereinafter, embodiments of the present invention will be described with reference to the drawings.

Figure 1:
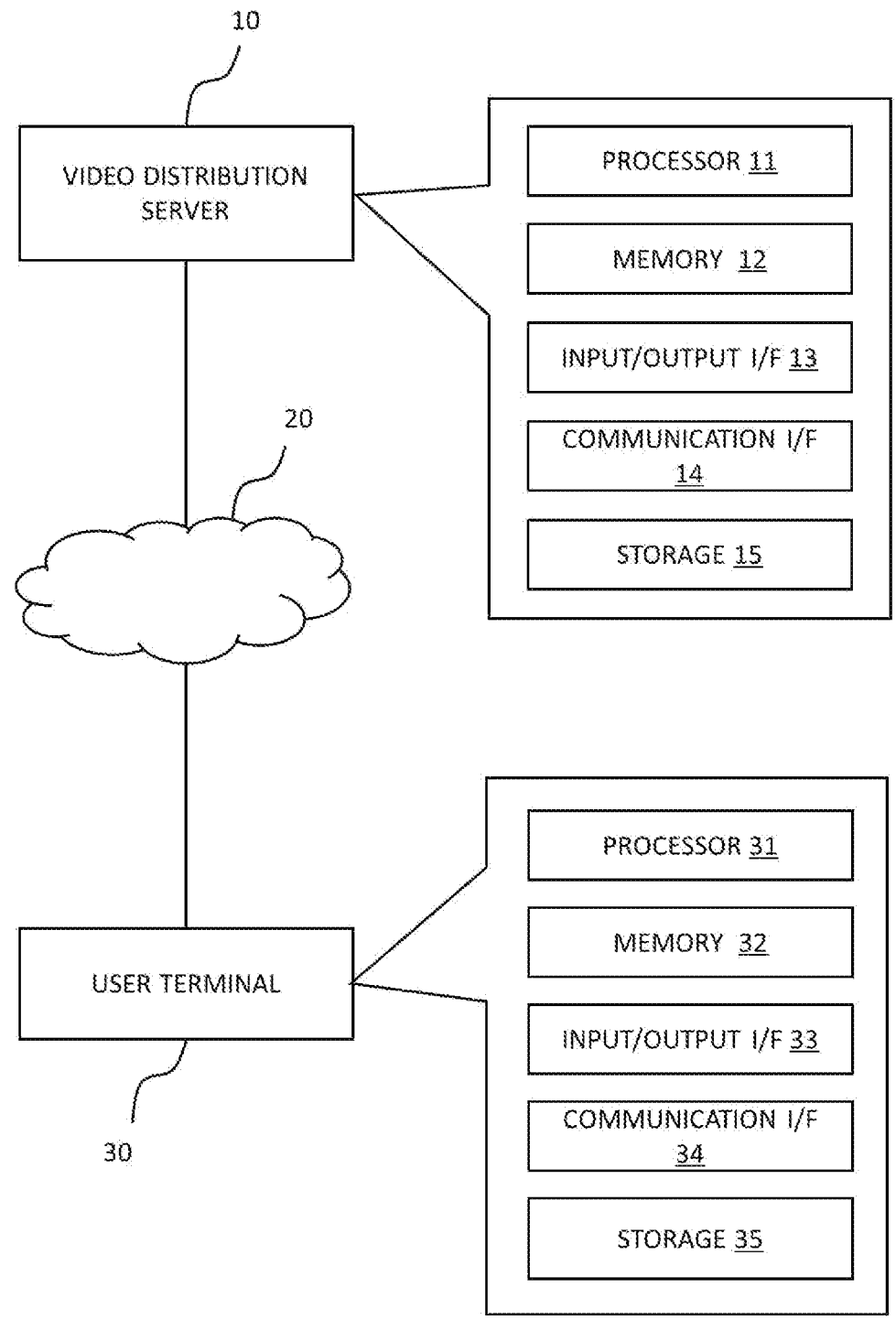
FIG. 1 is a configuration diagram schematically showing a configuration of a network including a video distribution server 10 according to an embodiment of the present invention.

FIG. 1 is a configuration diagram schematically showing a configuration of a network including a video distribution server 10 according to an embodiment of the present invention. As shown in the drawing, the video distribution server 10 is communicably connected to a user terminal 30 via a communication network 20 such as the Internet. Although only one user terminal 30 is shown in FIG. 1, the server 10 is communicably connected to a plurality of user terminals 30. The server 10 provides a live video distribution service for distributing and viewing a live video to a user via the user terminal 30. In the present embodiment, the user who operates the user terminal 30 can distribute the live video as a distributor, and can also view the live video of another user as a viewer. The video distribution server 10 is an example of a device that implements a part or all of the system of the present invention.

The video distribution server 10 is configured as a general computer, and as shown in FIG. 1, includes a computer processor 11, a main memory 12, an input/output I/F 13, a communication I/F 14, and a storage (storage device) 15, and these components are electrically connected via a bus or the like (not shown).

The computer processor 11 is configured as a CPU, a GPU, or the like, reads various programs stored in the storage 15 or the like into the main memory 12, and executes various commands included in the programs. The main memory 12 is configured of, for example, a DRAM or the like.

The input/output I/F 13 includes various input/output devices for exchanging information with a user and the like. The input/output I/F 13 includes, for example, an information input device such as a keyboard and a pointing device (for example, a mouse, a touch panel, and the like), an audio input device such as a microphone, and an image input device such as a camera. Further, the input/output I/F 13 includes an image output device such as a display and an audio output device such as a speaker.

The communication I/F 14 is implemented as hardware such as a network adapter, various pieces of communication software, and a combination thereof, and is configured to realize wired or wireless communication via the communication network 20 or the like.

The storage 15 is configured of, for example, a magnetic disk, a flash memory, or the like. The storage 15 stores various programs including an operating system, various pieces of data, and the like.

In the present embodiment, the video distribution server 10 can be configured using a plurality of computers, each of which has the above-mentioned hardware configuration. For example, the video distribution server 10 may be configured of one or more server devices.

The video distribution server 10 configured in this way can be configured to have functions as a web server and an application server. In this case, the video distribution server 10 executes various processes in response to a request from the web browser and other applications (for example, a live video distribution service application) installed on the user terminal 30, and transmits screen data (for example, HTML data), control data, and the like corresponding to the results of the processes to the user terminal 30. The user terminal 30 may display a web page or other screens based on the received data.

The user terminal 30 is configured as a general computer, and as shown in FIG. 1, includes a computer processor 31, a main memory 32, an input/output I/F 33, a communication I/F 34, and a storage (storage device) 35, and these components are electrically connected via a bus or the like (not shown).

The computer processor 31 is configured as a CPU, a GPU, or the like, reads various programs stored in the storage 35 or the like into the main memory 32, and executes various commands included in the programs. The main memory 32 is configured of, for example, a DRAM or the like.

The input/output I/F 33 includes various input/output devices for exchanging information with a user and the like. The input/output I/F 33 includes, for example, an information input device such as a keyboard and a pointing device (for example, a mouse, a touch panel, and the like), an audio input device such as a microphone, and an image input device such as a camera. Further, the input/output I/F 33 includes an image output device such as a display and an audio output device such as a speaker.

The communication I/F 34 is implemented as hardware such as a network adapter, various pieces of communication software, and a combination thereof, and is configured to realize wired or wireless communication via the communication network 20 or the like.

The storage 35 is configured of, for example, a magnetic disk, a flash memory, or the like. The storage 35 stores various programs including an operating system, various data, and the like. The program stored in the storage 35 can be downloaded and installed from an application market or the like.

In the present embodiment, the user terminal 30 can be configured as a smartphone, a tablet terminal, a personal computer, a wearable device, and the like.

The user who operates the user terminal 30 configured in this way can use the live video distribution service provided by the server 10 by executing communication with the video distribution server 10 via a web browser or other applications installed in the storage 35 or the like.

Figure 2:
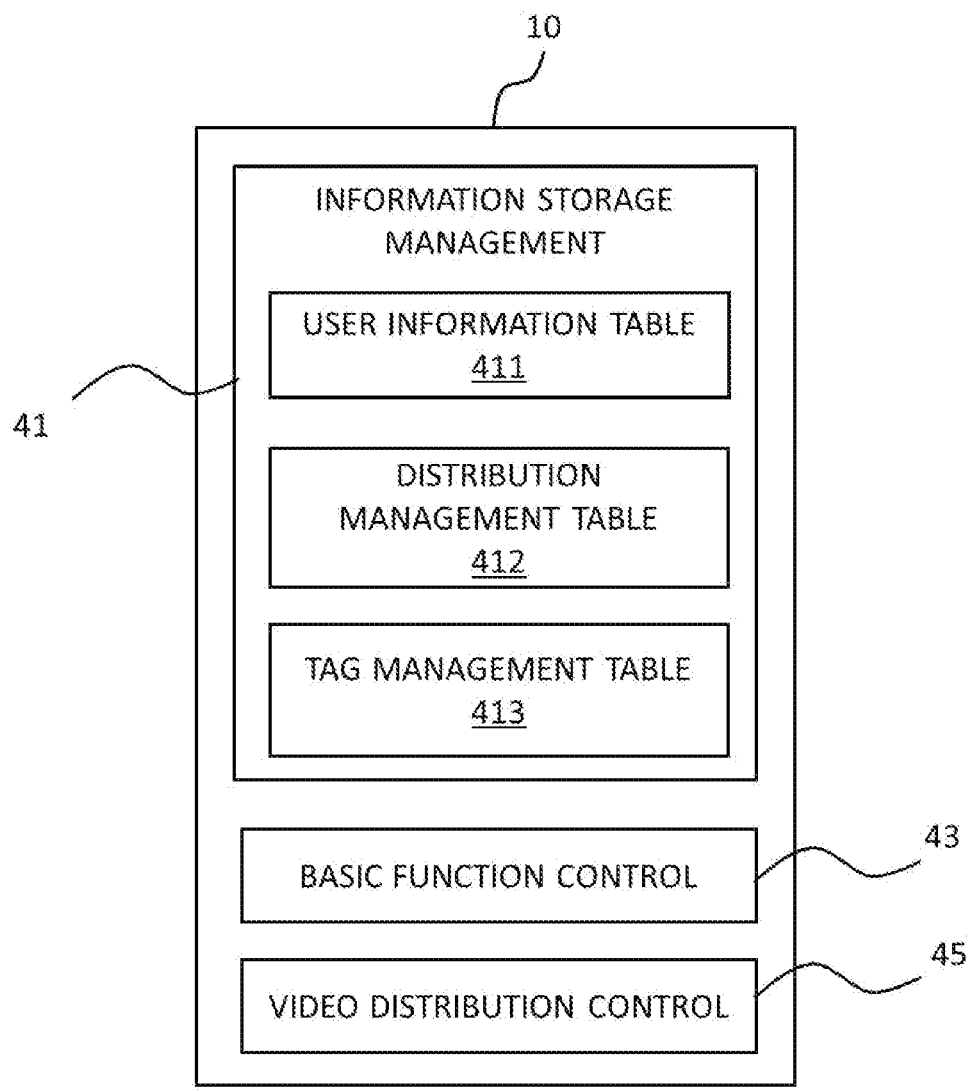
FIG. 2 is a block diagram schematically showing the functions of the video distribution server 10.

Next, the function of the video distribution server 10 configured in this way will be described. FIG. 2 is a block diagram schematically showing the functions of the video distribution server 10. As shown in the drawing, the server 10 has an information storage manager 41 that stores and manages various pieces of information, a basic function controller 43 that controls the basic function of the live video distribution service, and a video distribution controller 45 that controls distribution of live videos. These functions are realized by the hardware such as the computer processor 11 and the main memory 12 and various programs and data stored in the storage 15 and the like operating in cooperation with each other. For example, the functions are realized by the computer processor 11 executing commands included in the program read into the main memory 12. Further, a part or all of the functions of the server 10 shown in FIG. 2 may be realized by the cooperation of the server 10 and the user terminal 30, or may be realized by the user terminal 30.

The information storage manager 41 of the video distribution server 10 stores and manages various pieces of information in the storage 15 and the like. As shown in FIG. 2, the information storage manager 41 is configured to include, for example, a user information table 411 that manages information on users of the live video distribution service, a distribution management table 412 that manages information on individual video distribution, and a tag management table 413 that manages information on the tags associated with live videos.

The basic function controller 43 of the video distribution server 10 executes various processes related to the control of the basic functions of the live video distribution service. For example, the basic function controller 43 transmits screen data and control data of various screens related to the basic function to the user terminal 30, executes various processes in response to an operation input by the user via the screen displayed on the user terminal 30, and transmits screen data, control data, and the like corresponding to the results of the processes to the user terminal 30. The basic function controlled by the basic function controller 43 includes, for example, login processing (user authentication), billing control, user management (for example, updating of the user information table 411) and the like.

The video distribution controller 45 of the video distribution server 10 executes various processes related to the control of the live video distribution service. For example, the video distribution controller 45 is configured to distribute the live videos provided by the distributor to a plurality of viewers. For example, the video distribution controller 45 is configured to receive a live video transmitted from the user terminal 30 of the distributor (hereinafter, may be referred to as a "distributor terminal 30") and transmit the live video to the user terminals 30 of a plurality of viewers (hereinafter, may be referred to as "viewer terminals 30"). The live video is configured of, for example, an image input through the camera of the distributor terminal 30 and audio input via a microphone of the distributor terminal 30. Such a live video can be performed by, for example, a streaming method using a protocol such as HTTP Live Streaming (HLS).

In the present embodiment, the video distribution controller 45 is configured to present information on the live video being distributed to the user. For example, the video distribution controller 45 is configured to transmit screen data or control data of the screen including information on the live video being distributed to the user terminal 30. The information on the live video being distributed is obtained, for example, by referring to the distribution management table 412 or the like.

Further, the video distribution controller 45 is configured to execute various processes related to the management of the association of tags with the live video. For example, the video distribution controller 45 is configured to associate a tag input by a user (viewer) viewing a live video with this live video. The tag in the present embodiment is typically configured as information including a character string and contributes to the classification of live videos. The correspondence between the live video and the tag associated with the live video is managed, for example, in the tag management table 413.

Further, in the present embodiment, the video distribution controller 45 is configured to present information on the live video being distributed based on at least the associated tag. For example, the information on the live video being distributed may be configured to include information on a tag associated with the live video or information processed based on the tag. Also, for example, information on a live video being distributed may be configured as a list of live videos extracted or sorted based on the associated tag.

As described above, the video distribution server 10 in the present embodiment associates the tag input by the user who is viewing a live video with this live video and presents information on the live video being distributed based on the associated tag. Therefore, the user can know the current content (topic) of the live video being distributed from the information based on the tag input by the actual viewer. As a result, for example, a new user can comfortably start viewing the live video, and the viewing of the live video is promoted.

In the present embodiment, the state of the tag associated with the live video may be managed. For example, the video distribution controller 45 may be configured to manage tags whose elapsed time from being associated is within a predetermined time (for example, 5 minutes) as tags in a predetermined state. Also, the video distribution controller 45 may present information on the live video being distributed based on at least the tags in the predetermined state (for example, excluding tags whose elapsed time from being associated exceeds the predetermined time). A tag in the predetermined state can be said to be a tag that is currently valid (valid at that time) with a relatively short elapsed time since it has been input. Further, the predetermined time can be said to be the valid time of the tag. In such a configuration, tags whose elapsed time since they have been input is long are excluded when presenting information on the live video being distributed. Therefore, for example, information based on tags that are no longer suitable for the current content of the live video is prevented from being presented.

Further, the video distribution controller 45 may be configured to limit the number of tags in the predetermined state associated with one live video. For example, the video distribution controller 45 is configured to disable (reject) a new tag to be associated while the number of tags in the predetermined state associated with a specific live video is the upper limit. Such a configuration can prevent the number of tags from becoming excessively large, and as a result, prevent the function of the tags as a classification of a live video from being impaired.

Further, the video distribution controller 45 may be configured to limit the number of tags that can be associated with one live video within a predetermined time. For example, the video distribution controller 45 is configured to disable (reject) a new tag to be associated while the number of tags associated, from the present time to a predetermined time ago, with a specific live video is the upper limit. Such a configuration can prevent the number of tags from becoming excessively large, and as a result, prevent the function of the tags as a classification of a live video from being impaired.

Further, the video distribution controller 45 may be configured to limit the number of tags that can be associated with one live video by one user within a predetermined time. For example, the video distribution controller 45 is configured to disable (reject) a new tag to be associated with a specific live video while the number of tags associated, from the present time to a predetermined time ago, with the specific live video by a specific user is the upper limit. For example, if the number of tags that can be associated within a predetermined time is limited to "1", the continuous input of tags by one user is prohibited (leaving a predetermined time interval is needed). Such a configuration prevents the tags associated with a live video from being input by only a specific user in a biased manner.

Further, in the present embodiment, the users who can input tags may be restricted. For example, the video distribution controller 45 may be configured to limit users who can input tags based on at least a predetermined attribute possessed by the user. For example, users who can input tags are limited to users whose level is equal to or higher than a predetermined value. Further, for example, users who can input tags may be limited to users who have a predetermined relationship with a user (distributor) who distributes a live video (for example, a member of a group supporting the distributor). The predetermined attributes are managed, for example, in the user information table 411. Such a configuration prevents the deterioration of the quality of the tags by limiting the users who can input.

Further, the video distribution controller 45 may be configured to receive comments input via a viewing screen for viewing the live video and also receive tags input via the viewing screen. The input comments are typically displayed on the viewing screen of each viewer. In this case, the viewing screen may be configured to have a predetermined area where a character string can be input. In the predetermined area, the character string input in the first state is recognized as a comment, while the character string input in the second state is recognized as a tag. Switching between the first and second states may be performed in response to the operation input by the user or may be performed without the operation input by the user. Such a configuration enables the input of tags in the same operation as the operation of inputting comments, and as a result, realizes good operability regarding the input of tags.

In the present embodiment, the information on the live video being distributed presented to the user includes various types of information. For example, the video distribution controller 45 may be configured to present a list of tags respectively associated with a plurality of live videos being distributed. In this case, the tag list may be configured such that the tag associated with a larger number of live videos is prioritized (for example, it is placed at the top of the list). Such a configuration allows the user to be easily informed of the content (topic) of the live videos in the entire live video distribution service.

In addition, the information on the live video being distributed presented to the user includes a list of live videos. For example, the video distribution controller 45 may be configured to present a list of live videos being distributed based on at least tags respectively associated with a plurality of live videos being distributed. For example, the list may be configured as a list in which tags respectively associated with a plurality of live videos being distributed are arranged in chronological order together with a corresponding live video (associated live video). The list can also be referred to as a tag timeline. For example, each time a new tag is associated with any live video, the new tag is added to the list together with the corresponding live video. Such a configuration allows the user to be informed of the tags and the corresponding live videos in chronological order.

Further, for example, the video distribution controller 45 may be configured to present a list composed of a plurality of live videos associated with a specific tag (for example, a tag specified by a user or a tag automatically specified). Such a configuration improves the searchability of a live video associated with, for example, a particular tag (for example, a tag that the user is interested in).

Further, the video distribution controller 45 may be configured to display, on a viewing screen for viewing a specific live video, a predetermined notification regarding a tag corresponding to the specific live video in the above-described list of live videos based on tags when any user starts viewing the specific live video via this list. For example, the predetermined notification includes a notification regarding the user's start of viewing via the corresponding tag. Also, for example, the predetermined notification includes a notification regarding a user who associates the corresponding tag with the specific live video. Such a configuration enables notification in response to the start of viewing of the live video via the tag, and as a result, can facilitate the viewer's input of the tag.

Further, the video distribution controller 45 may be configured to increase the value of a predetermined parameter of a user who associates a tag, which corresponds to a specific live video in the above-described list of live videos based on tags, with the specific live video when any user starts viewing the specific live video via this list. The predetermined parameter may be configured, for example, as the number of other users who have started viewing the live video via the tag associated by the user. For example, the basic function controller 43 may be configured to set a ranking based on the value of such a predetermined parameter. Such a configuration can improve the gameplay of tag association and, as a result, facilitate the viewer's input of tags.

Further, the video distribution controller 45 may be configured to automatically post a posting content introducing the live video to a predetermined SNS in response to the association of tag with the live video (for example, before or after the association). The posting content includes the tag associated with the live video. For example, the video distribution controller 45 is configured to automatically post a posting content, in which the tag is included as a hashtag and a link to a live video to be introduced is set, to an SNS such as Twitter (registered trademark) or Instagram (registered trademark). The automatic posting is performed through or without a user's confirmation operation. Such a configuration supports the spread of live videos via SNS.

Further, the video distribution controller 45 may be configured to associate a tag input by a user who is viewing a live video with a user (distributor) who distributes the live video in addition to the live video. The tag associated with the distributor can be managed, for example, in the user information table 411 and displayed on a predetermined screen (for example, a screen displaying the profile of the distributor). Such a configuration allows the tag input by the viewer to be utilized as a part of the distributor's attribute (profile).

Next, a specific example of the video distribution server 10 of the present embodiment having such a function will be described. FIG. 3 illustrates the information managed in the user information table 411 in this example. The user information table 411 manages information on users of the live video distribution service, and as shown in the drawing, manages the following information in associated with a "user account" that identifies an individual user. The information includes "basic information" including an account name, age, gender, and the like, "distribution history information" which is information on distribution history of a live video, "viewing history information" which is information on viewing history of a live video distributed by another user, "following user information" which is information on other users that this user is following, "follower information" which is information on other users (followers) who are following this user, "family information" which is information on the family that this user has joined as a family member, "rank" indicating the rank of the user as a distributor, "rank meter value" which is a parameter value for determining whether to increase or decrease the rank, "number of holding coins" indicating the number of holding virtual coins, available in the live video distribution service, "number of holding diamonds" indicating the number of holding virtual diamonds, available in the live video distribution service, "tag point information" which is information on a tag point (predetermined parameter) which increases with the input of tags as a viewer, "tag information" which is information on tags input by a viewer during distribution of live videos as a distributor, and "classification text" which is the classification set by the user as a distributor.

FIG. 4 is a diagram for explaining the "rank" of the distributor in this example. As shown in this example, there are six rank bands of "S", "A", "B", "C", "D" and "E". Each of the five rank bands of "S", "A", "B", "C", and "D" has three ranks (for example, a rank with "+" added to the alphabet indicating the rank band, a rank with only the alphabet, and a rank with "−" added to the alphabet, such as "S+", "S", and "S−"). Further, the rank band of "E" is configured of one rank "E". That is, in this example, there are 16 steps (3×5+1=16).

Further, in the rank bands, the "S" side is the highest and the "E" side is the lowest. Further, in the ranks in the same rank band, the "+" side is the highest and the "−" side is the lowest. In this example, the user rank is set to "D−" as an initial value.

FIG. 5 illustrates the information managed in the distribution management table 412 in this example. The distribution management table 412 manages information on individual live videos, and as shown in the drawing, manages the following information in association with a "distribution ID" that identifies individual distributions (live videos). The information includes "distributor user account" that identifies a distributor of the distribution, "distribution date and time", "distribution time" indicating the duration of distribution, "number of viewers (current value and maximum value)", "number of comments" which is the number of comments input by viewers, "number of likes" which is the number of "likes" input by viewers, "item points" which increases according to the input of items by viewers, and "distribution points" which is the point assigned for this distribution.

FIG. 6 illustrates the information managed in the tag management table 413 in this example. The tag management table 413 manages information on the tags associated with live videos, and as shown in the drawing, manages the following information in association with a combination of "distribution ID" that identifies an individual distribution and "tag ID" that identifies an individual tag. The information includes "inputter user account" which is a user account of a viewer (tag inputter) who input the tag, "tag content" which is the content (character string) of the tag, "added date and time (year, month, day, hour, minute, second)" which is the date and time when the tag has been added.

Figure 7:
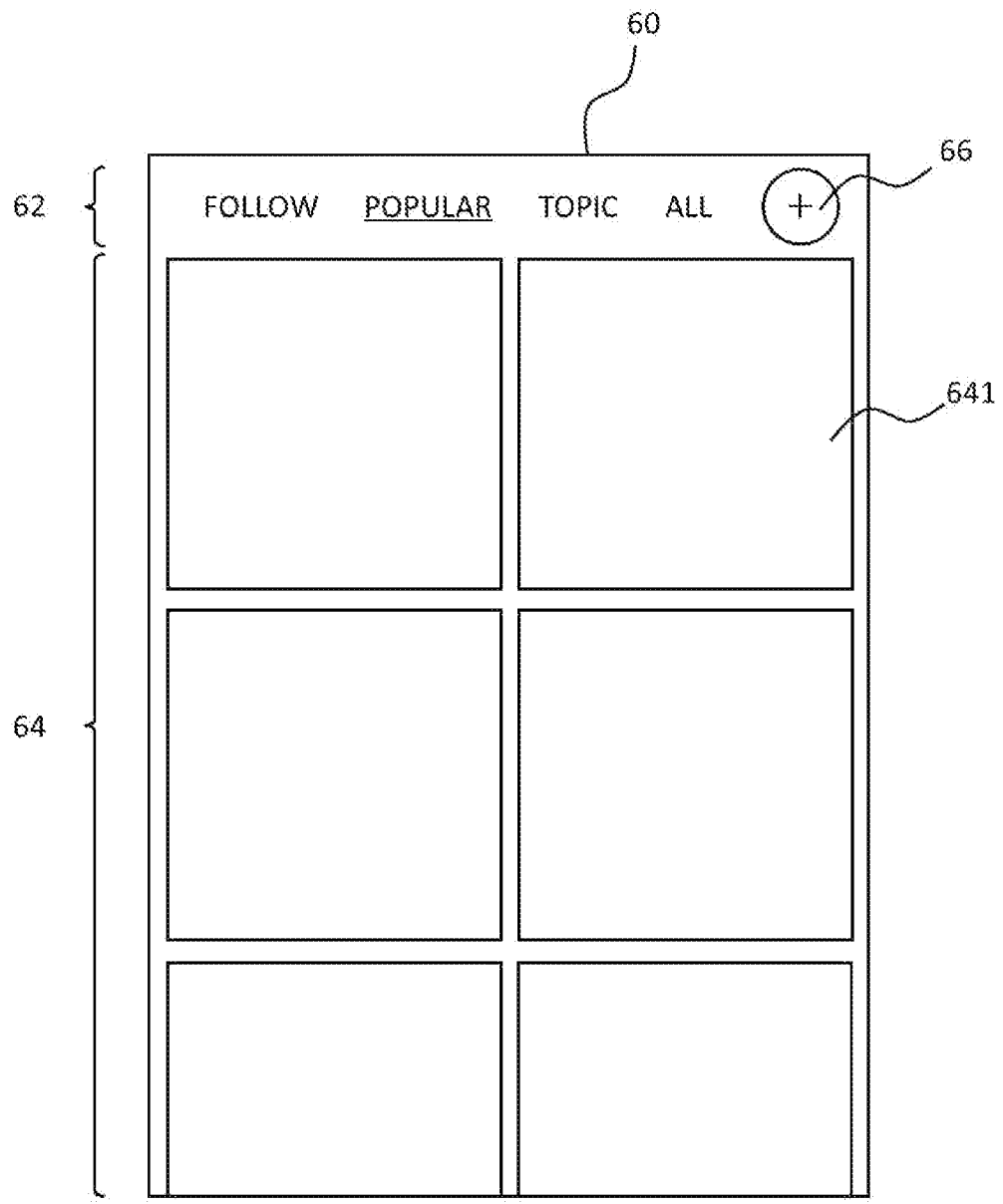
FIG. 7 is a diagram illustrating a top screen 60.

FIG. 7 illustrates a top screen 60 of the live video distribution service displayed on the user terminal 30. The screen 60 is a screen that serves as a starting point for a user who uses the live video distribution service. As shown in the drawing, the screen 60 includes a selection area 62 where "follow", "popular", "topic", and "all" are displayed, a list display area 64 located below the area 62 and a circular distribution start button 66 located in the upper right corner of the screen.

The selection area 62 is an area for selecting display contents in the list display area 64. Specifically, when "follow" is selected in the selection area 62, a list of live videos being distributed by other users followed by the user is displayed in the list display area 64. Similarly, when "popular" is selected in the selection area 62, a list of live videos (for example, live videos of which the number (current value) of viewers is equal to or larger than a threshold value) extracted according to a predetermined extraction condition for extracting popular videos is displayed in the list display area 64. When "topic" is selected in the selection area 62, a list of tags added to (associated with) live videos is displayed in the list display area 64 in chronological order together with the corresponding live video, which will be described in detail later. When "all" is selected in the selection area 62, a list of all live videos being distributed is displayed in the list display area 64.

The top screen 60 of FIG. 7 corresponds to the case where "popular" is selected in the selection area 62. In the list display area 64 in this case, as shown in the drawing, a plurality of individual display areas 641 each displaying information on an individual live video are arranged in two columns. The individual display area 641 is configured so that the viewing of the corresponding live video can be started according to the selection by the user. The list display area 64 is configured so that the displayed individual display area 641 is switched by a flick operation, a slide operation, or the like in the vertical direction. The configuration of the list display area 64 when "follow" or "all" is selected in the selection area 62 is the same as the configuration described above when "popular" is selected. The configuration of the list display area 64 when "topic" is selected in the selection area 62 will be described later.

The distribution start button 66 is an object for the user to start distribution of the live video as a distributor. When the distribution start button 66 is selected by the user, the distribution of the live video is started. Specifically, transmission of a video composed of an image input through the camera of the user terminal 30 and audio input via the microphone of the user terminal 30 to the server 10 is started. Further, a new record is created in the distribution management table 412 according to the start of distribution of the live video.

Figure 8:
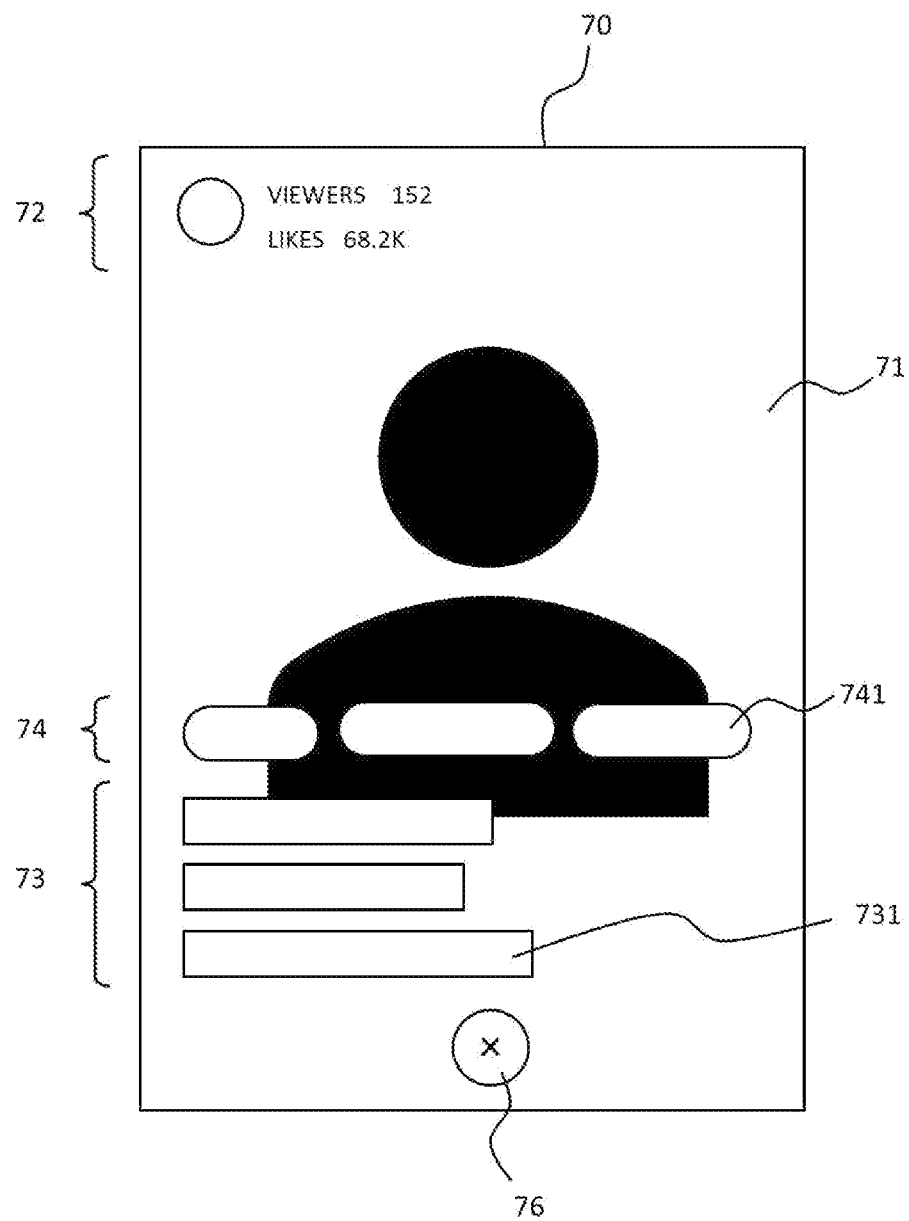
FIG. 8 is a diagram illustrating a distribution screen 70.

FIG. 8 illustrates a distribution screen 70 displayed on the distributor terminal 30 in response to the selection of the distribution start button 66 (that is, the start of distribution of the live video). As shown in the drawing, the screen 70 has a video display area 71 corresponding to the entire screen, a basic information display area 72 located in the upper left corner of the screen, a comment display area 73 located in the lower left corner of the screen, a tag display area 74 located on the upper side of the area 73, and a circular distribution stop button 76 located at the center of the lower end of the screen.

The video display area 71 displays a live-distributed video, that is, an image input via the camera of the distributor terminal 30. Since the distributor usually takes the distributor himself/herself as a subject via the in-camera or the like of the distributor terminal 30, the live-distributed video includes the image of the distributor himself/herself.

The basic information display area 72 displays the basic information of this distribution, and specifically, displays the distributor information (profile image and the like), the number of viewers (current value) of this distribution, and the number of "likes" input by the viewers for this distribution.

The comment display area 73 displays the user comment input by the viewer or the system comment automatically input by the server 10. Specifically, in the area 73, a plurality of comment objects 731, each corresponding to an individual comment, are arranged side by side in the vertical direction. The comment display area 73 is configured so that, when a new comment is input, the corresponding comment object 731 is added to the lower side and the existing comment object 731 moves upward in order. The comment display area 73 is configured so that the displayed comment object 731 is switched by a flick operation, a slide operation, or the like in the vertical direction.

The tag display area 74 displays information on the tags added to the distribution (live video). Specifically, in the area 74, a plurality of tag objects 741 each corresponding to an individual tag are arranged side by side in the left-right direction. The details of the tag display area 74 will be described later.

The distribution stop button 76 is an object for the distributor to stop the distribution of the live video. When the distribution stop button 76 is selected by the distributor, the distribution of a live video (transmission of a live video from the distributor terminal 30 to the server 10) is stopped.

Figure 9:
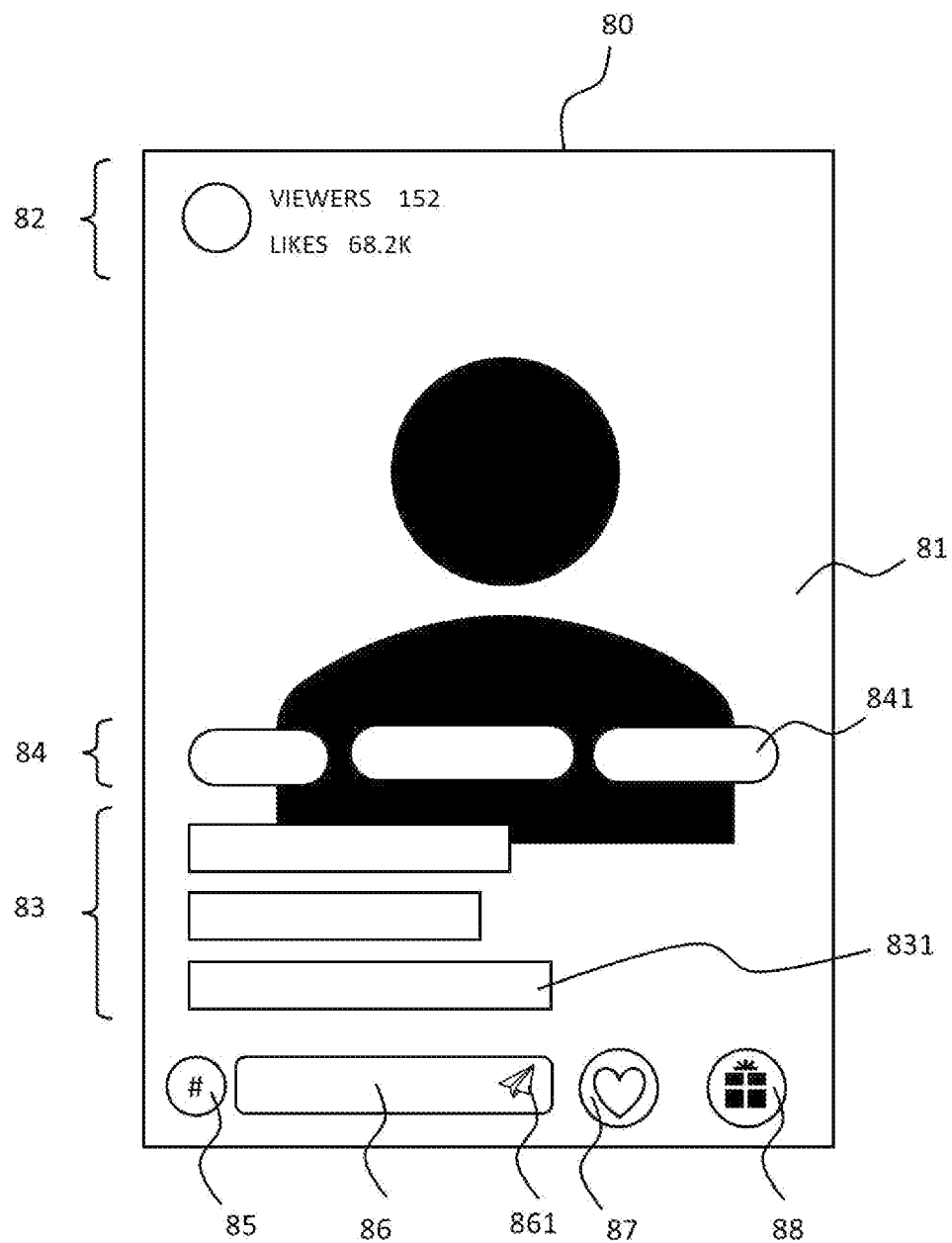
FIG. 9 is a diagram illustrating a viewing screen 80.

FIG. 9 illustrates a viewing screen 80 displayed on the viewer terminal 30. For example, when a certain live video is selected by the viewer via the list display area 64 of the top screen 60 or the like, the viewing screen 80 for viewing the selected distribution is displayed on the viewer terminal 30. As shown in the drawing, the screen 80 has a video display area 81, a basic information display area 82, a comment display area 83, and a tag display area 84, similarly to the distribution screen 70 described above. Further, the viewing screen 80 includes, at the lower end of the screen, an input mode switching button 85, a comment input area 86, a "like" button 87 on which a heart mark is displayed, and an item input button 88 on which a gift pattern is displayed.

The comment input area 86 is an area for the viewer to input a comment. A transmission object 861 is arranged at the right end of the comment input area 86. When the transmission object 861 is selected, a character string input in the comment input area 86 is transmitted as a user comment, and the comment objects 731 and 831 corresponding to the comment are added to the comment display areas 73 and 83 of the distribution screen 70 of the distributor terminal 30 and the viewing screen 80 of each of the viewer terminals 30. In the comment objects 731 and 831 corresponding to the user comment, the comment itself (character string) is displayed together with the account name of the viewer who has input the comment. Further, when the comment is input, the number of comments in the distribution management table 412 is updated (added by 1).

The like button 87 is an object for the viewer to input a "like" to the distributor. When the button 87 is selected by the viewer, "like" is input, the system comment regarding the input of "like" is input, and the corresponding comment objects 731 and 831 are added in the comment display areas 73 and 83. In the comment objects 731 and 831 corresponding to the system comment regarding the input of "like", a text indicating the input of "like" is displayed together with the account name of the viewer who has input the "like". Further, when "like" is input, a predetermined visual effect (for example, an animation effect that a heart-shaped object is displayed so as to move from the lower side to the upper side of the screen) is added in the video display areas 71 and 81. Further, when "like" is input, the "number of likes" in the distribution management table 412 is updated (added by 1).

Figure 10:
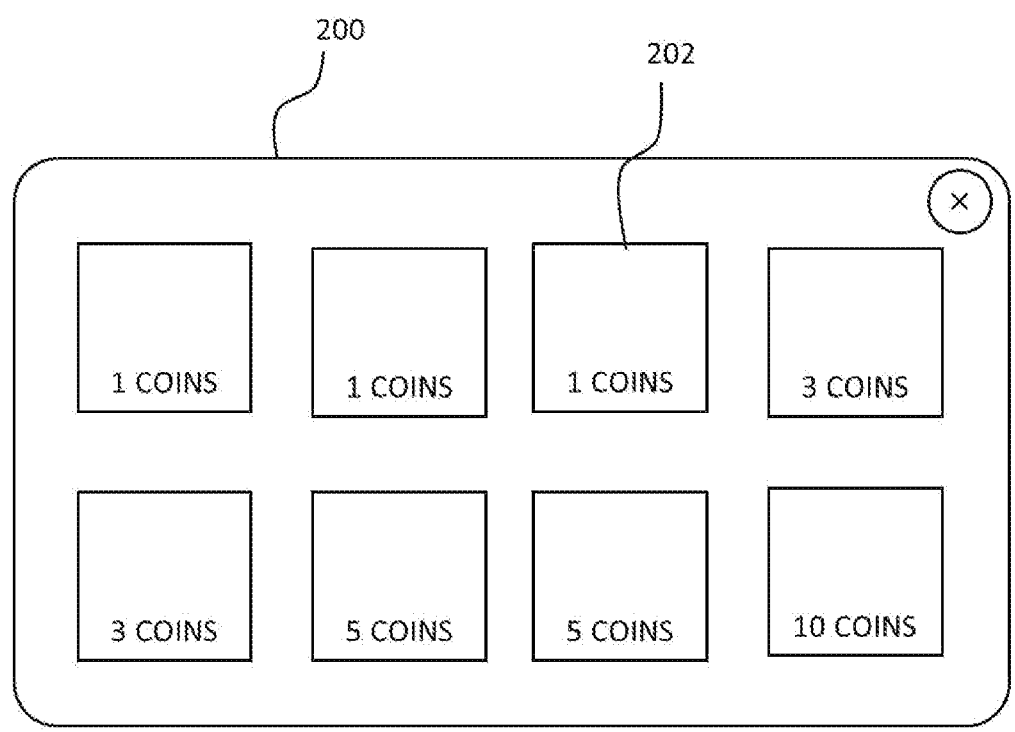
FIG. 10 is a diagram illustrating an item selection screen 200.

The item input button 88 is an object for the viewer to input an item. When the button 88 is selected by the viewer, the item selection screen 200 illustrated in FIG. 10 is displayed to be superimposed on the viewing screen 80. As shown in the drawing, the screen 200 displays a list of a plurality of individual display areas 202, each displaying information on an item. The individual display area 202 displays an image corresponding to the item and the number of coins required for inputting the item.

In this example, a plurality of items that can be input by the viewer is determined in advance, and the number of coins as the price (value) is set in advance for each item. The item selection screen 200 displays a list of a plurality of items that can be input. When a certain item is selected by the viewer via the item selection screen 200, the selected item is input.

When an item is input, the system comment regarding the input of the item is input, and the corresponding comment objects 731 and 831 are added to the comment display areas 73 and 83. In the comment objects 731 and 831 corresponding to the system comment regarding the input of the item, the name of the input item is displayed together with the account name of the viewer who has input the item. Further, when an item is input, a visual effect corresponding to the input item is added to the video display areas 71 and 81.

Further, when an item is input, item points corresponding to the number of coins of the input item (for example, the larger the number of coins, the larger the number of points) are added to this distribution, and are added to the item points of the corresponding distribution in the distribution management table 412. Further, when an item is input, the number of coins of the input item is subtracted from the number of holding coins of the corresponding user (the viewer who has input the item) in the user information table 411.

Here, the operation related to addition of tags to the live video in this example will be described. The input mode switching button 85 of the viewing screen 80 is an object for inputting a tag via the comment input area 86. While the input mode switching button 85 is in a non-selected state, the comment input area 86 is a normal comment input mode, and as described above, the character string input to the comment input area 86 is transmitted as a comment in response to the selection of the transmission object 861. On the other hand, when the input mode switching button 85 is in the selected state, the comment input area 86 is in a tag input mode, and the character string input to the comment input area 86 is transmitted as a tag in response to the selection of the transmission object 861.

In this example, the inputter of the tag is limited to the family members (users having a predetermined relationship) of the distributor of the live video to which the tag is added (that is, the live video which is being viewed). Specifically, the input mode switching button 85 of the viewing screen 80 can be selected (enabled) when the viewer is a family member of the distributor, while it is unselectable (disabled) when the viewer is not a family member of the distributor.

Figure 11:
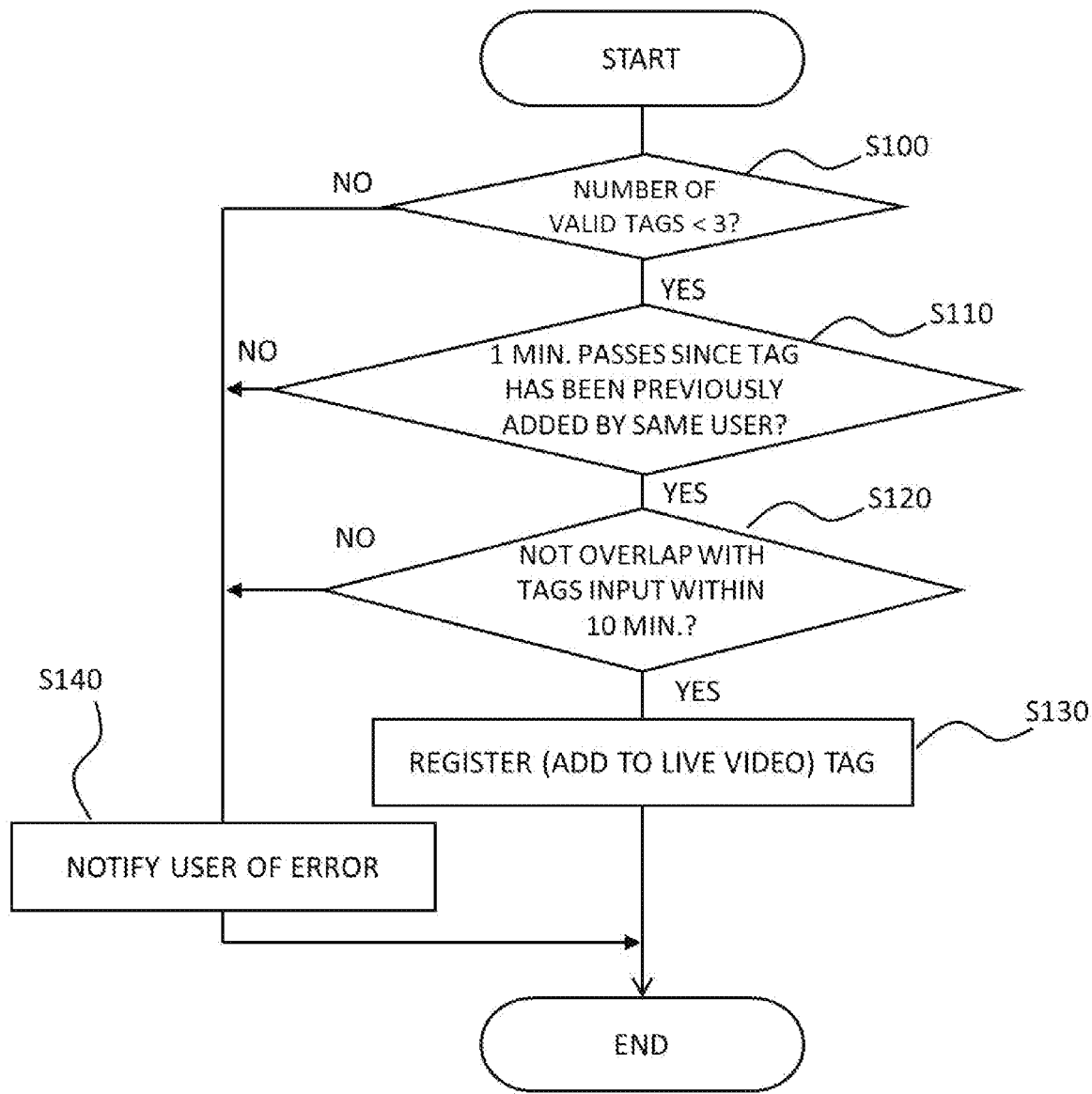
FIG. 11 is a flowchart illustrating a process executed by the server 10 in response to a certain viewer's input of a tag.

FIG. 11 is a flow chart illustrating a process executed by the server 10 in response to a certain viewer's input (transmission) of a tag. When the tag is input, first, as shown in the drawing, the server 10 checks whether the number of tags that are currently valid (valid at that time) in the target live video (distribution) is less than three (that is, two or less) (step S100). In this example, the tag added to the live video is managed as the currently valid state until 5 minutes have passed since it has been added. That is, in other words, in this example, the "number of currently valid tags" can be said to be the number of tags added up to 5 minutes before the present. The currently valid tag is specified by referring to the added date and time in the tag management table 413.

Subsequently, if the number of currently valid tags is less than 3 (YES in step S100), then the server 10 checks whether one minute or more passes since a tag has been previously added by the same user to the target live video (step S110). The time of the previous tag addition by the same user is specified by referring to the inputter user account and the added date and time in the tag management table 413.

Then, if one minute or more passes since a tag has been previously added by the same user (YES in step S110), the server 10 checks whether the content (character string) of the tag does not overlap with the tags added within 10 minutes to the target live video (step S120). The content of the tag added within 10 minutes is specified by referring to the tag content and the added date and time in the tag management table 413. As described above, in this example, since the tag that 5 minutes pass since it has been added is no longer in the currently valid state, the "tag added within 10 minutes" can be said to be a "currently valid tag or tag within 5 minutes after it is no longer valid".

Subsequently, if the content of the tag does not overlap with the tags input within 10 minutes (YES in step S120), then the server 10 registers the input tag (adds to the live video) (step S130). Specifically, a new record is registered in the tag management table 413. In addition, the tag information in the user information table 411 of the corresponding distributor is updated (this tag is added).

On the other hand, when the number of currently valid tags is three or more (NO in step S100), when 1 minute or more does not pass since the tag has been previously added by the same user (NO in step S110), or when the content of the tag overlaps with the tags added within 10 minutes (NO in step S120), the server 10 notifies the user who has input the tag of an error (step S140). In this case, the input tag is not registered (not added to the live video), and the tag is discarded. As described above, in this example, the number of currently valid tags that can be added to one live video is limited to three, the number of tags that one user can add for one live video within one minute is limited to one, and the number of identical tags that can be added to one live video within 10 minutes is limited to one. In this example, limitations on the content of tags (for example, limitations on the number of characters, limitations with NG words, and the like) may be set.

When a tag is added, the tag objects 741 and 841 corresponding to the added tag are added in the tag display areas 74 and 84 of the distribution screen 70 of the distributor terminal 30 and the viewing screen 80 of each of the viewer terminals 30. The tag objects 741 and 841 corresponding to the currently valid tag are arranged side by side in the left-right direction so that the left side of the tag display areas 74 and 84 is newer (the added time is later). Therefore, the tag objects 741 and 841 corresponding to the newly added tag are added to the left end in the tag display areas 74 and 84. When the tag that 5 minutes pass since it has been added is no longer in the currently valid state, the corresponding tag objects 741 and 841 are deleted (for example, it disappears with an animation effect of moving to the right).

The tag objects 741 and 841 in this example display the content of the tag in the hashtag format in which "#" is added to the beginning of the character string. For example, when the content of the tag is "Tokyo sightseeing", "#tokyosightseeing" is displayed in the tag objects 741 and 841. The length of the tag objects 741 and 841 in the left-right direction is automatically adjusted according to the length of the character string to be displayed.

Further, when the tag is added, a system comment regarding the addition of the tag is input, and the corresponding comment objects 731 and 831 are added to the comment display areas 73 and 83. In the comment objects 731 and 831 corresponding to the system comment regarding the tag addition, the content of the added tag are displayed together with the account name of the viewer who has added (input) the tag. For example, a comment "xx-san tagged "#tokyo-sightseeing" to the distribution" is displayed.

In this example, the tag added to the live video is used to display information on the live video being distributed on the top screen 60. For example, the tag added to the live video is displayed as a part of the information on the live video in the individual display area 641 of the list display area 64.

Figure 12:
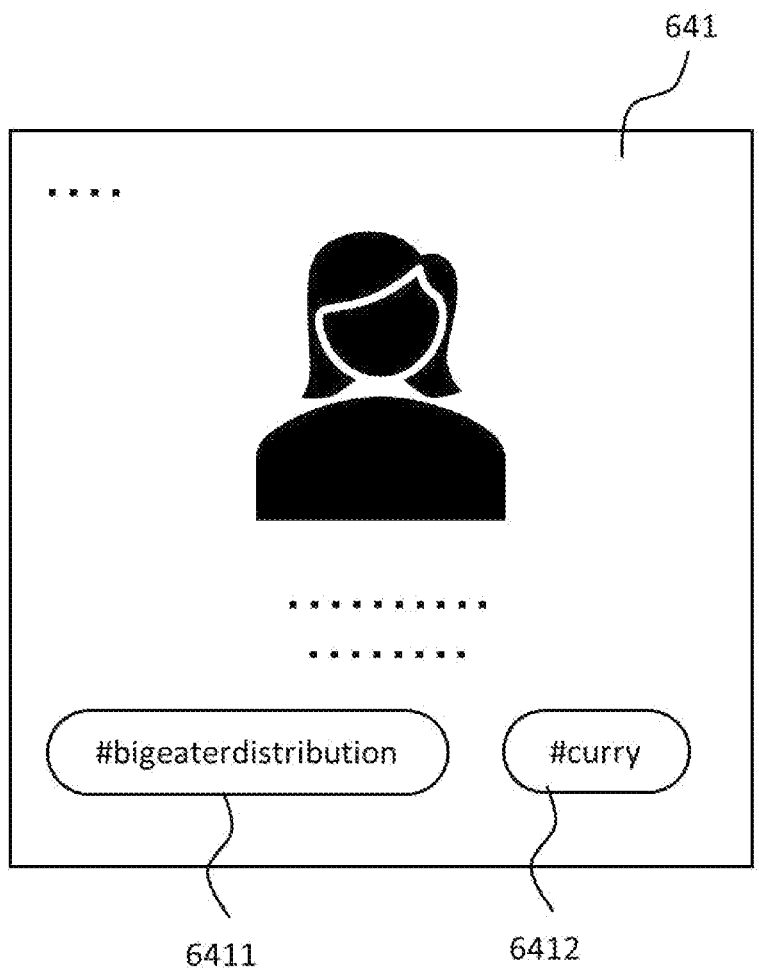
FIG. 12 is a diagram illustrating the display content of an individual display area 641.

FIG. 12 illustrates the display content of the individual display area 641. The individual display area 641 displays a still image preset by the distributor of the live video, the account name of the distributor, the number of viewers (current value), and the like. As shown in the drawing, at the lower end thereof, a first tag object 6411 and a second tag object 6412 are arranged side by side in the left-right direction. In the first tag object 6411, the classification text (managed in the user information table 411), which is the classification of the distributor set by the distributor, is displayed in a hashtag format (a format that adds "#" to the beginning of a character string) (in the example of FIG. 12, "#bigeaterdistribution" is displayed). In addition, in the second tag object 6412, the currently valid tag added to the corresponding live video is displayed in the same hashtag format (in the example of FIG. 12, "#curry" is displayed). When a plurality of currently valid tags is added to the corresponding live video, one tag selected according to a predetermined rule (for example, a randomly selected tag or the latest tag and the like) is displayed. In this way, by displaying both the classification text set by the distributor and the tag input by the viewer in the individual display area 641, the user can be more appropriately informed of the information on the content of the live video.

Figure 13:
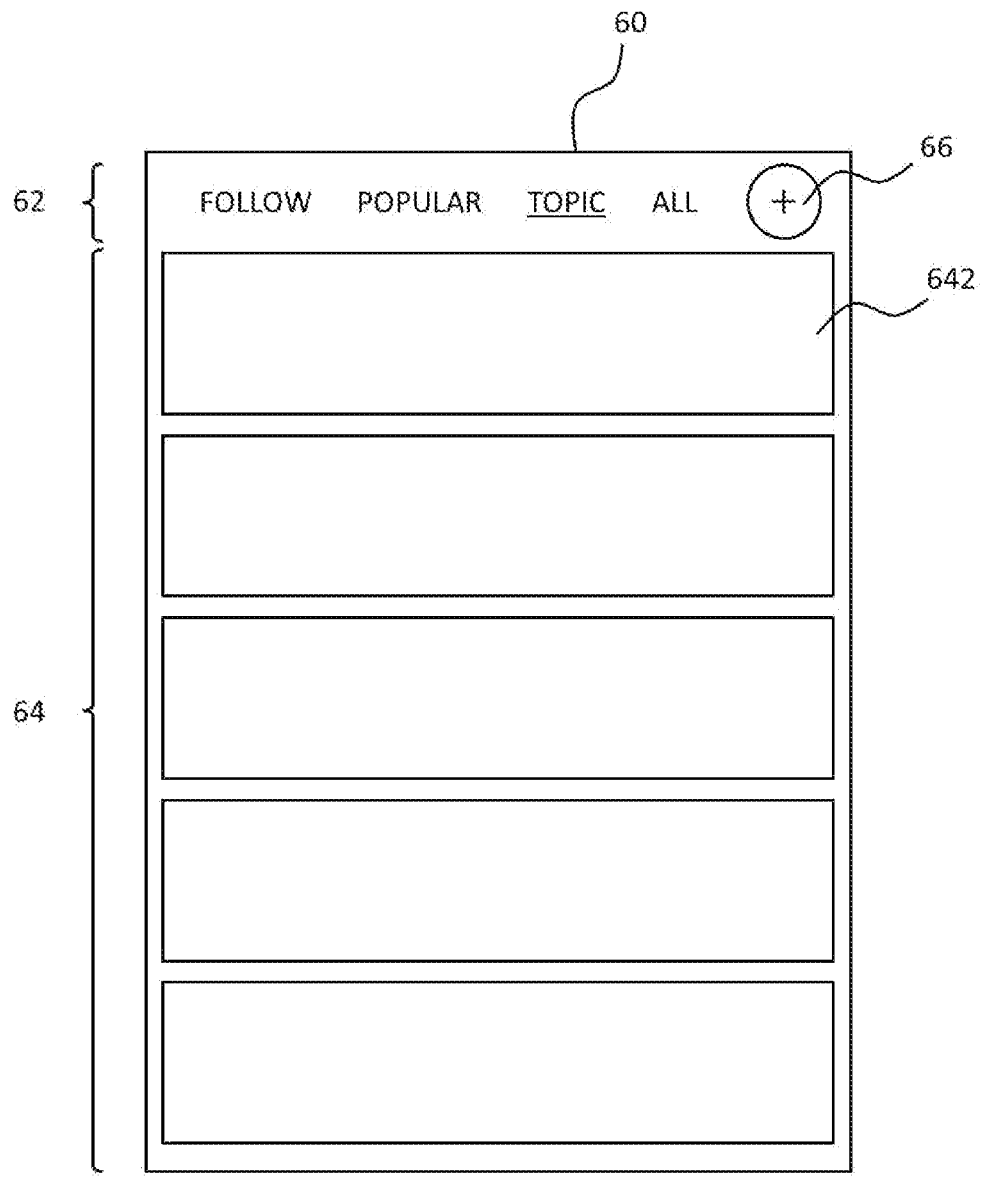
FIG. 13 is a diagram illustrating the top screen 60 when "topic" is selected in a selection area 62.

Further, for example, the tag added to the live video is used for extracting and selecting the live video to be displayed in a list on the top screen 60. FIG. 13 illustrates the top screen 60 when "topic" is selected in the selection area 62. In this case, the top screen 60 displays a list of tags added to any live videos in chronological order together with the corresponding live video in the list display area 64. In other words, in the list display area 64 when "topic" is selected in the selection area 62, a list of tags and corresponding live videos arranged in descending order of the added date and time of the tag are displayed.

In the list display area 64, a plurality of individual display areas 642, each displaying an individual tag and information related to the corresponding live video, are arranged side by side in the vertical direction. When a new tag is added to a certain live video, the corresponding individual display area 642 is added to the top of the list display area 64.

Figure 14:
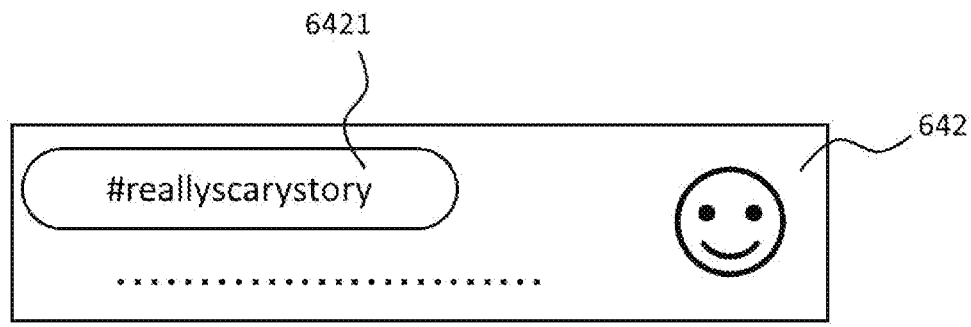
FIG. 14 is a diagram illustrating the display content of an individual display area 642.

FIG. 14 illustrates the display content of the individual display area 642. As shown in the drawing, the area 642 has a tag object 6421 arranged in the upper left corner, and displays a profile image and an account name of the distributor of the corresponding live video (to which the tag is added), and the like. A link to the corresponding live video is set in the individual display area 642, and the user can start viewing the corresponding distribution by selecting any one of the plurality of individual display areas 642 displayed in the list display area 64. In this example, for example, when a plurality of different tags is added to one live video in a short period of time, a plurality of individual display areas 642 corresponding to the plurality of tags are arranged, and a link to the same live video is set in these areas 642.

Figure 15:
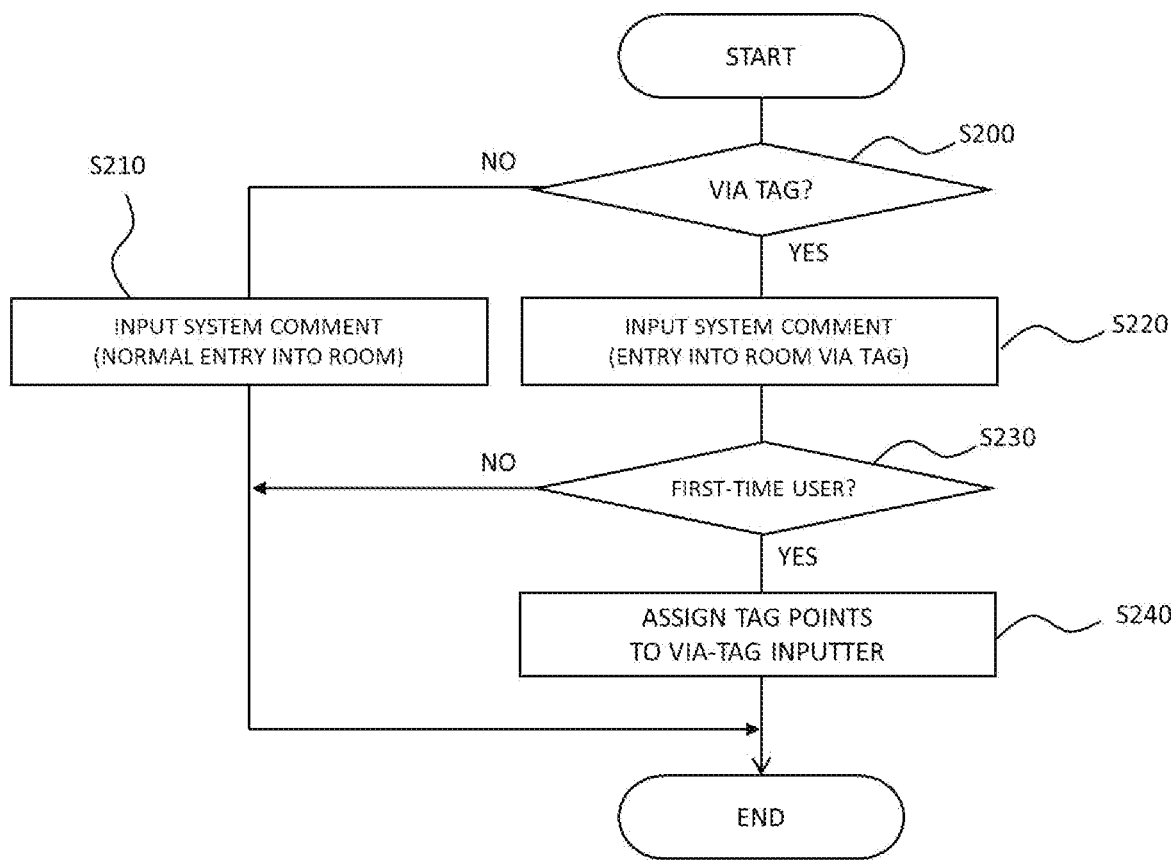
FIG. 15 is a flowchart illustrating a process executed by the server 10 when a certain user starts viewing a live video.

The operation related to addition of tags to a live video has been described above. Next, the operation when a user starts viewing the live video will be described. FIG. 15 is a flowchart illustrating a process executed by the server 10 when a certain user starts viewing a live video (enters the distribution room). When a certain user starts viewing the live video, as shown in the drawing, first, the server 10 inputs a system comment regarding the user's normal entry into the room (step S210) when the user has started viewing the live video not via the tag (NO in step S200). In this example, the "start of viewing the live video via the tag" is specifically to start viewing the live video, in the state where the "topic" is selected in the selection area 62 of the top screen 60, via the list display area 64 (by selecting any of the plurality of individual display areas 642 listed in the area 64).

When a system comment regarding the normal entry into the room is input, comment objects 731 and 831 corresponding to the system comment are added to the comment display areas 73 and 83. The account name and the like of the user who has started viewing (has entered the room) are displayed in the comment objects 731 and 831 corresponding to the system comment regarding the normal entry into the room.

On the other hand, when the user has started viewing the live video via the tag (YES in step S200), the server 10 then inputs a system comment regarding the entry into the room via the tag (entry with via-tag) (step S220). When the system comment is input, the corresponding comment objects 731 and 831 are added to the comment display areas 73 and 83 as described above.

In this example, in addition to the account name of the user who has entered the room, the via-tag is displayed in the comment objects 731 and 831 corresponding to the system comment regarding the entry into the room via the tag. The via-tag is a tag corresponding to the individual display area 642 selected by the user in the list display area 64 of the top screen 60. For example, a comment "A-san came to visit this room from "#xxx" ("A-san" is the user who entered the room and "xxx" is the via-tag) is displayed in the comment objects 731 and 831.

When the system comment regarding the entry into the room via the tag is input in this way, the server 10 assigns tag points to the inputter of the via-tag (step S240) when the user who has started the viewing is the first-time user (the user who views the live video of this distributor for the first time) (YES in step S230). Specifically, the tag point information of the user information table 411 is updated for the inputter. The tag inputter is identified by referring to the inputter user account in the tag management table 413.

In this example, the tag point information includes the tag points of each family (that is, each distributor) in which the corresponding user (inputter) is a family member, and in step S240, predetermined points are added to the tag points of the corresponding family. In this example, the ranking of the tag points (for example, the ranking within the same family) is set and published periodically.

In this example, when the user has entered the room via a tag and the user who has entered the room is a first-time user, the corresponding system comment may be further input. The corresponding system comment includes, for example, the inputter of the via-tag and the number of first-time users who has entered the room via this tag. For example, a comment "yy first-time users came to visit this room via "#xxx" input by X-san" ("yy" is the number of first-time users) is displayed in the corresponding comment objects 731 and 831. In addition, the corresponding system comment includes, for example, the number of first-time users who has entered the room via all tags (the present via-tag and the other tags) that the inputter of the via-tag has input in a predetermined period of time (for example, this month). For example, a comment "zzz first-time users came to visit this room via X-san's tags this month" ("zzz" is the number of first-time users) is displayed in the corresponding comment objects 731 and 831.

The operation when a user starts viewing the live video has been described above. Next, the operation when the distributor ends the distribution will be described. As described above, when the distributor selects the distribution stop button 76 on the distribution screen 70, the live distribution ends. When the live distribution ends, the server 10 calculates and sets the number of distribution points for the distribution. In this example, the number of distribution points is calculated based on the number of viewers (maximum value), the number of likes, the number of comments, and the number of item points. The number of distribution points increases as the number of viewers (maximum value), the number of likes, the number of comments, and the number of item points increase. The calculated number of distribution points is registered in the distribution management table 412.

Figure 16:
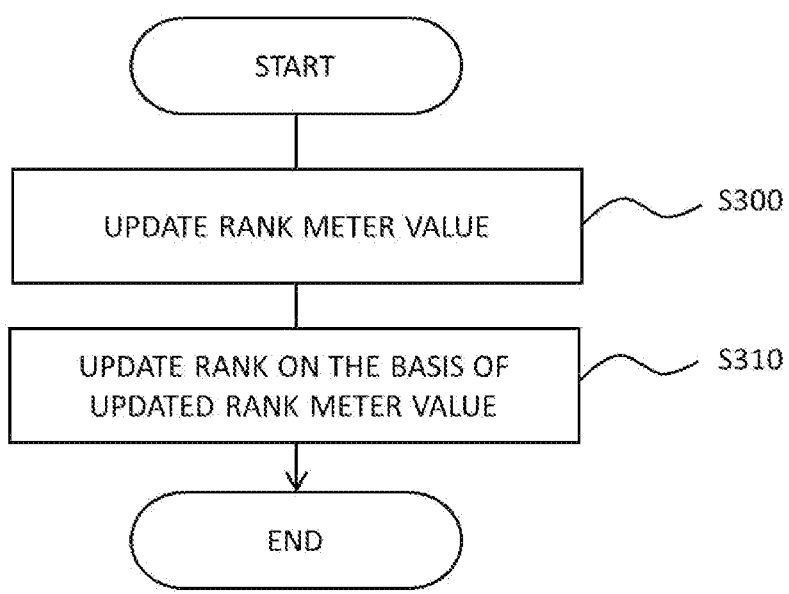
FIG. 16 is a flowchart illustrating a process executed by the server 10 when updating the rank of each user.

In this example, the rank of the day is determined (updated) based on the number of distribution points acquired by the user on the previous day. FIG. 16 is a flowchart illustrating a process executed by the server 10 when updating the rank of each user. This process is performed daily at midnight (for example, 3 AM daily).

First, as shown in the drawing, the server 10 updates the rank meter value of each user (step S300). FIG. 17 is a diagram for explaining the update rule of the rank meter value. As shown in the drawing, in this example, the rank meter value varies based on the ranking of the number of distribution points of each user on the previous day in the rank band to which the user belongs. The number of distribution points acquired by a specific user on the previous day is calculated by referring to the distributor user account, the distribution date and time, and the distribution points in the distribution management table 412. When the user performs a plurality of distributions in one day, the numbers of distribution points acquired in the plurality of distributions are added up.

Specifically, as shown in FIG. 17, the rank meter value update rule is as follows. First, when the ranking of the number of distribution points in the rank band is included in the top 10%, the variation of the rank meter value is "+2" (increased by 2 points). Similarly, the variation is "+1", when the ranking is included in the top 11% to 30% (the remaining 20% excluding the top 10% to the top 30%), the variation is "±0" (not changed) when the ranking is the middle 30% (the top 31% to 60%), and the variation is "−1" (decreased by 1 point) when the ranking is included in the lower 40%. If no distribution is performed in the previous day, the variation of the rank meter value will be "−1" regardless of the ranking in the rank band.

In step S300, the rank meter value of each user is updated according to the update rule illustrated in FIG. 17. When a user has the rank meter value that is negative and the variation in rank meter value this time is the increase (specifically, +2 or +1), the rank meter value may be cleared to zero and then increased from there. For example, when a user's current value of the rank meter value is "−1" and the variation this time of the user is "+2", the rank meter value is cleared to zero and then increased by two. Thus, the rank meter value after the variation is "+2" (not "+1"). In this way, even when a user has the rank meter value that is negative (for example, a user with a low distribution frequency), the rank meter value can be increased all at once, which may promote the distribution of live videos.

When the rank meter value of each user is updated, the server 10 then updates the rank based on the updated rank meter value (step S310). FIG. 18 is a diagram for explaining the correspondence between the updated content of the rank and the required rank meter value. As shown in the drawing, first, the rank meter value required for increasing the rank across rank bands (in other words, for a user to move up in the ranks from the highest rank in each rank band) is +4. That is, when the rank meter value reaches +4, the user belonging to the highest rank (for example, A+) in each rank band moves up in the ranks to the lowest rank (for example, S−) in the rank band immediately above. Further, the rank meter value required for increasing the rank within the same rank band (in other words, for a user to move up in the ranks from the middle or lowest rank in each rank band) is +2. That is, when the rank meter value reaches +2, the user belonging to the middle or lowest rank (for example, B or B−) in each rank band moves up in the ranks to a rank (for example, B+ or B) immediately above in the same rank band.

Similarly, as illustrated in FIG. 18, the rank meter value required for decreasing the rank within the same rank band (in other words, for a user to move down in the ranks from the highest or middle rank in each rank band) is −2. That is, when the rank meter value reaches −2, the user belonging to the highest or middle rank (for example, B+ or B) in each rank band moves down in the ranks to a rank (for example, B or B−) immediately below in the same rank band. In addition, the rank meter value required for decreasing the rank across rank bands is −6. That is, when the rank meter value reaches −6, the user belonging to the lowest rank (for example, A−) in each rank band moves down in the ranks to the highest rank (for example, B+) in the rank band immediately below. As described above, in this example, the rank meter value required for increasing or decreasing the rank across the rank bands is larger than that required for increasing or decreasing the rank within the same rank band. As a result, increasing or decreasing the rank rapidly in a short period of time is suppressed.

In step S310, the rank based on the rank meter value is updated according to the correspondence illustrated in FIG. 18. The rank meter value of the user whose rank has been updated (the user whose rank has been increased/decreased) is cleared to zero.

Figure 19:
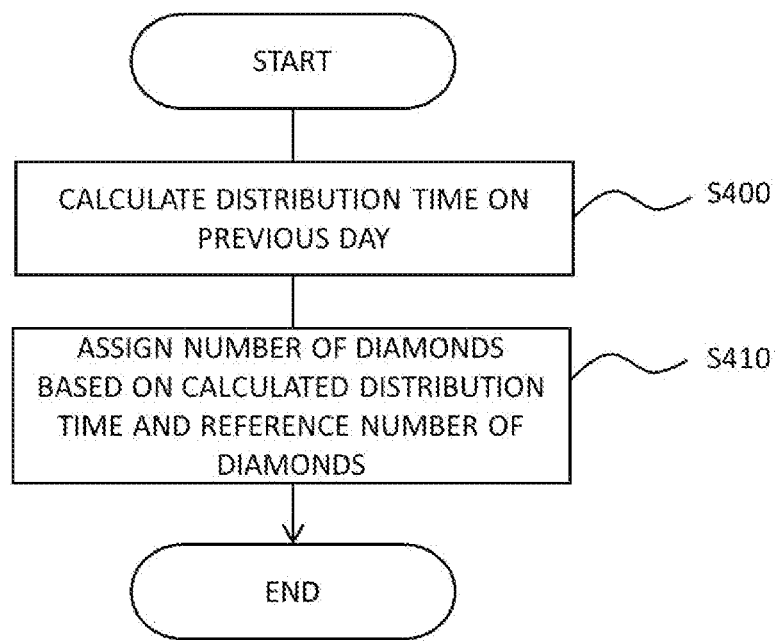
FIG. 19 is a flowchart illustrating a process executed by the server 10 when a diamond is assigned.

In this example, a diamond, which is a reward for the user as a distributor, is given based on the distribution time of the previous day and the rank (the rank on the previous day). FIG. 19 is a flowchart illustrating a process executed by the server 10 when assigning a diamond to each distributor. This process is executed at midnight every day, for example, is executed at a time (for example, 0 o'clock AM every day) before the processing executed when updating the rank of each user illustrated in FIG. 16.

First, the server 10 calculates the distribution time of each user on the previous day as shown in the drawing (step S400). The distribution time of the previous day of a specific user is specifically calculated by referring to the distributor user account and the distribution date and time in the distribution management table 412. When the user performs a plurality of distributions in one day, the distribution times of the plurality of distributions are added up.

Subsequently, the server 10 assigns each user a number of diamonds based on the calculated distribution time and a reference number of diamonds (step S410). Specifically, each user is given a number of diamonds obtained by multiplying the calculated distribution time by the reference number of diamonds. The reference number of diamonds is set in advance for each rank so that the higher the rank, the larger the reference number of diamonds, and the reference number of diamonds corresponding to the rank of each user on the previous day is applied. When a diamond is given to the user, the number of holding diamonds in the corresponding record in the user information table 411 is updated. In this example, diamonds can be exchanged with coins or real currency.

Figure 20:
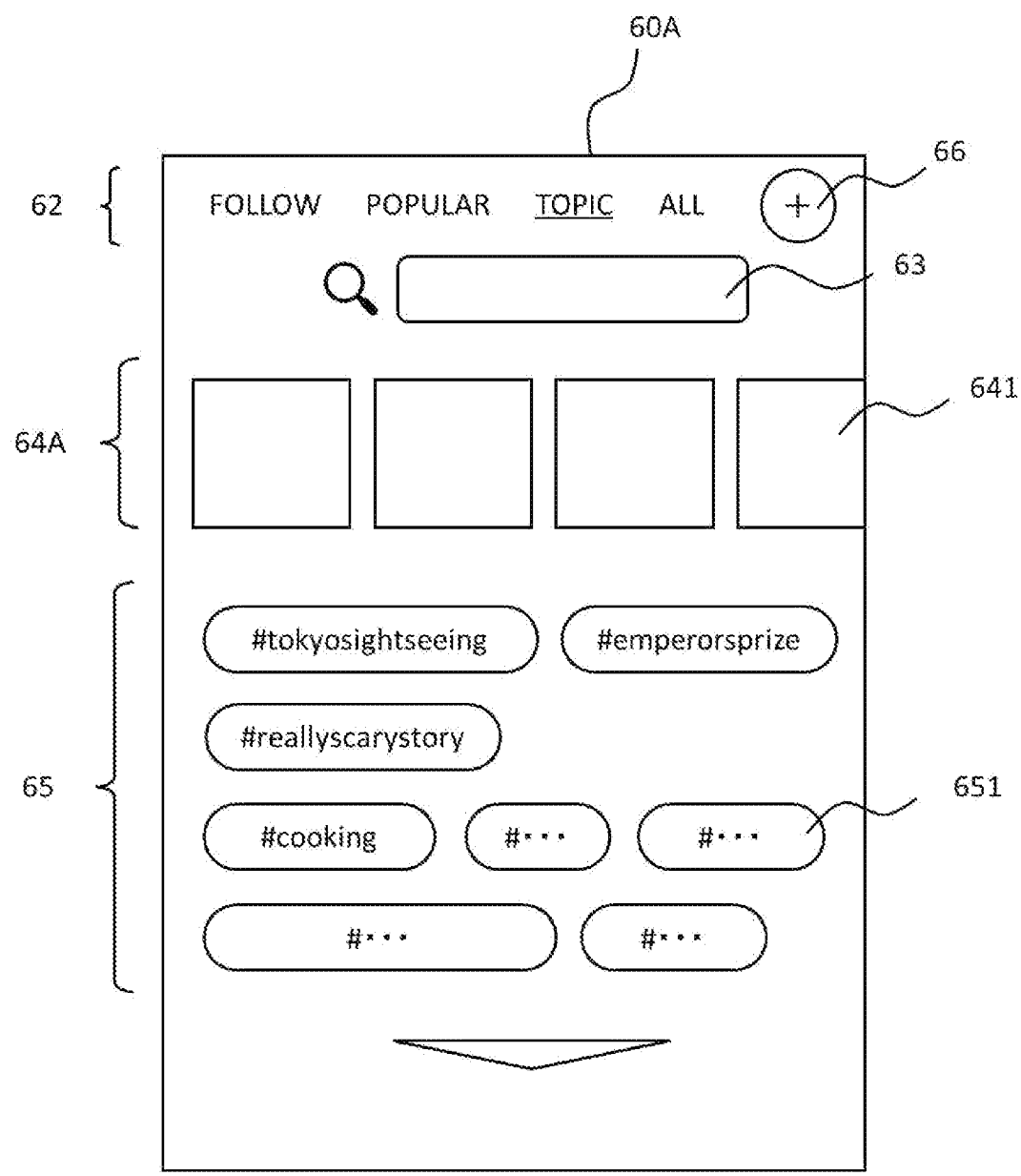
FIG. 20 is a diagram illustrating a top screen 60A.

The top screen 60 in the above-mentioned example is an example of a screen for displaying information on a live video being distributed, and other screens may be applied in another example of the present embodiment. FIG. 20 illustrates a top screen 60A in another example of the present embodiment and illustrates the top screen 60A in which "topic" is selected in the selection area 62. In this case, the top screen 60A is provided with a tag search area 63 for searching for tags, a first list display area 64A for displaying a list of live videos to which the most talked-about tag (the tag added to the largest number of live videos as the currently valid tag) is added, and a second list display area 65 for displaying a list of currently valid tags respectively added to a plurality of live videos being distributed.

In the first list display area 64A, a plurality of individual display areas 641, each displaying information on an individual live video, are arranged side by side in the left-right direction. When any of the plurality of individual display areas 641 is selected, viewing the corresponding live video is started. The start of viewing in response to the selection of the individual display area 641 is determined as entry into the room (start of viewing) via the tag.

In the second list display area 65, a plurality of tag objects 651, each of which corresponds to an individual tag, are arranged. In the area 65, the tag object 651 corresponding to the tag added to a larger number of live videos is arranged on the upper side, and among the tag objects 651 arranged at the same height, a tag object 651 corresponding to the tag added to a larger number of live videos is located on the left side.

Figure 21:
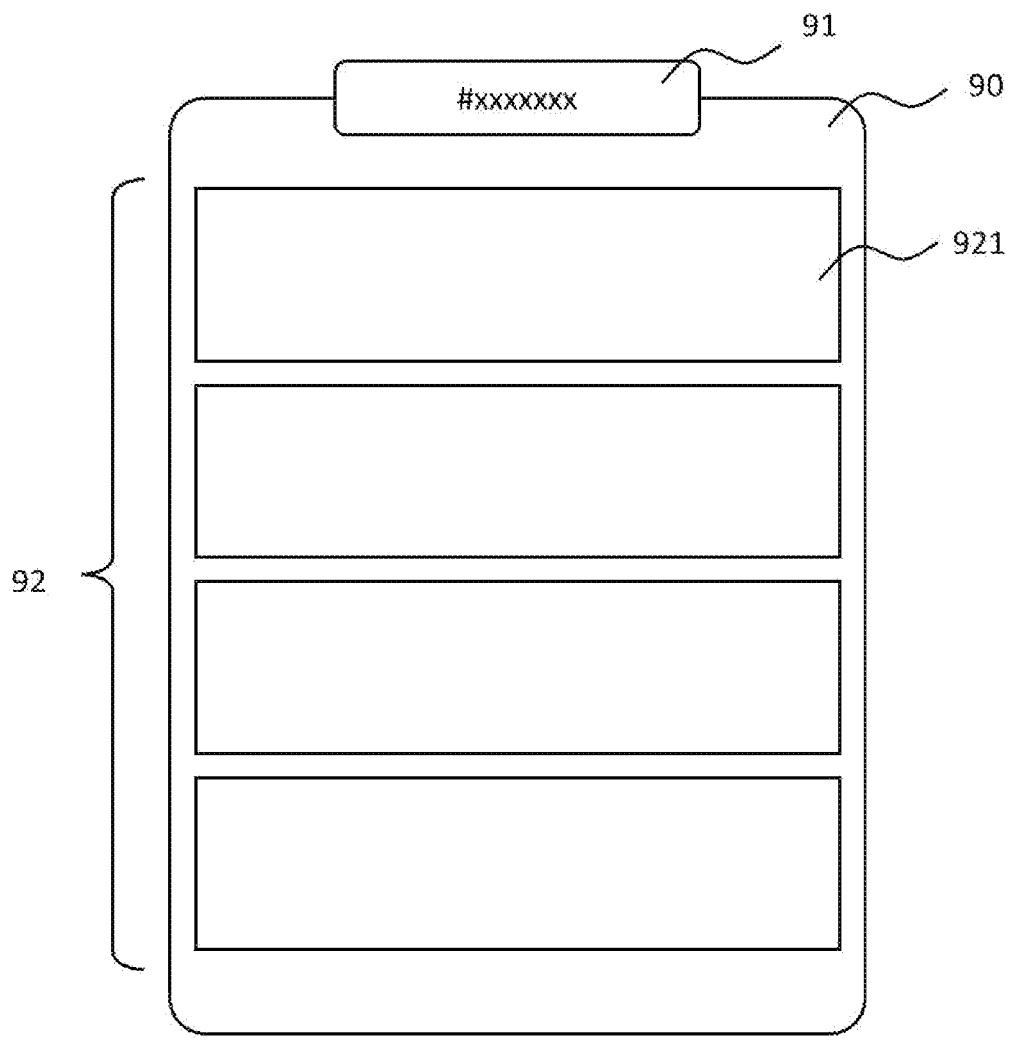
FIG. 21 is a diagram illustrating a tag-specific video list screen 90.

When any one of the plurality of tag objects 651 is selected, a tag-specific video list screen 90 illustrated in FIG. 21 is displayed to be superimposed on the top screen 60A. The screen 90 is a screen for displaying a list of live videos to which a specific tag is added as a currently valid tag. As shown in the drawing, the screen 90 includes a tag display object 91 for displaying the content of a tag specified as the specific tag (the content of the tag corresponding to the selected tag object 651) and a list display area 92 for displaying a list of live videos to which the specified tag is added as a currently valid tag. In the area 92, a plurality of individual display areas 921, each of which displays information on an individual live video, are arranged side by side in the vertical direction. The individual display area 921 displays the profile image and account name of the distributor, and the like. When any of the plurality of individual display areas 921 is selected, viewing the corresponding live video is started. The start of viewing in response to the selection of the individual display area 921 is determined as the entry into the room (start of viewing) via the tag. Even when a currently valid tag is searched for and selected via the tag search area 63, the tag-specific video list screen 90 corresponding to the selected tag is displayed.

Figure 22:
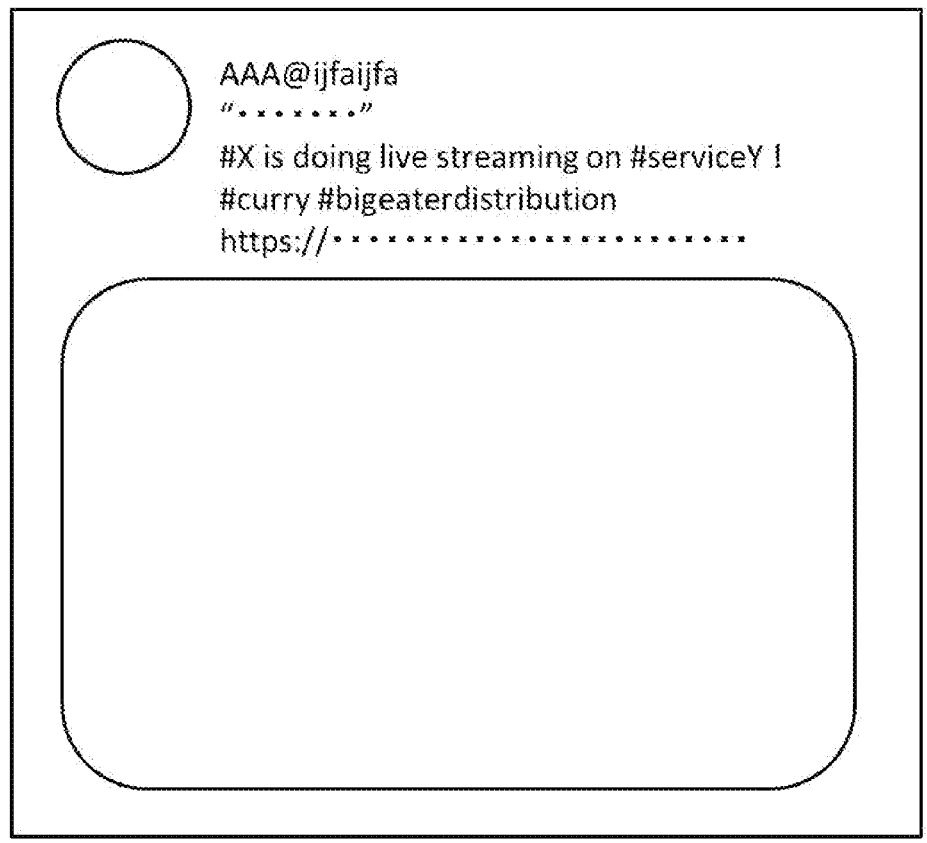
FIG. 22 is a diagram illustrating contents automatically posted to an external SNS.

In the above-mentioned example, automatic posting to an external SNS may be performed in response to addition of tags to a live video. FIG. 22 illustrates the contents automatically posted to an external SNS. The automatic posting is performed using the SNS account of the tag inputter (for example, it can be managed in the user information table 411), and the contents for posting is generated according to the setting of OGP (Open Graph Protocol). For example, the contents for posting includes a message containing the distributor's account name, the service name of the live video distribution service, the currently valid tag, and the classification text as hashtags. For example, the contents includes a text "#X is doing live streaming on #serviceY !, #curry #bigeaterdistribution" ("X" is the distributor's account name, "serviceY" is the service name, "curry" is the currently valid tag, and "bigeaterdistribution" is the classification text).

In the above-described example, the tag is added by the viewer of the live video, but in addition to this, the tag may be added by the distributor who is distributing the live video.

In the above-described example, the tag added to the live video may be deleted by the distributor. For example, the corresponding tag may be deleted via an operation of selecting the tag object 741 arranged in the tag display area 74 of the distribution screen 70 (for example, a long-press operation or the like). When the tag is deleted, the corresponding record in the tag management table 413 is deleted and is also deleted from the tag information in the user information table 411.

In the above-described example, it may be possible to input a tag accompanied by consumption of coins. In this case, the more coins are consumed, the longer the valid period of the tag may be.

In the above-described example, the live video archive may be made available for later viewing. In this case, since all the tags added during the live distribution of the archived live video are managed in the tag management table 413, the live video may be searched using the tags. For example, on a screen for displaying the profile of the distributor or the like, a list of tags input by the viewer in the past (managed in the tag information of the user information table 411) may be displayed. When any of the tags is selected via the list, the archived live video to which the selected tag is added may be searched and displayed.

The video distribution server 10 of the present embodiment described above associates (adds) the tag input by the user who is viewing a live video with this live video and presents information on the live video being distributed based on the associated tag. Therefore, the user can know the current content (topic) of the live video being distributed from the information based on the tag input by the actual viewer. As a result, for example, a new user can comfortably start viewing the live video, and the viewing of the live video is promoted.

The processes and procedures described in the present specification are implemented by software, hardware, or any combination thereof, in addition to those expressly described. For example, the processes and procedures described in the present specification are realized by implementing logic corresponding to the processes and procedures on a medium such as an integrated circuit, a volatile memory, a non-volatile memory, or a magnetic disk. Further, the processes and procedures described in the present specification can be implemented as a computer program corresponding to the processes and procedures and executed by various computers.

Even if it is explained that the processes and procedures described in the present specification are executed by a single device, software, component, module, such processes or procedures may be executed by multiple devices, multiple pieces of software, multiple components, and/or multiple modules. The software and hardware components described in the present specification can also be realized by integrating them into fewer components or by breaking them down into more components.

In the present specification, even when the components of the invention are described as either singular or plural, or the components of the invention are described without limitation to either singular or plural, the components may be either singular or plural except that they should be understood separately in the context.

What is claimed is:

1. A system comprising one or more computer processors, the one or more computer processors executing machine-readable instructions to perform:
   presenting information on at least one of a plurality of live videos being distributed to a user; and
   managing association of tags with the live videos, wherein
   the managing of the association includes associating a first tag input by a first user viewing a first live video with the first live video;
   the presenting includes presenting the information based on at least one of the tags in a predetermined state in which an elapsed time after each of the tags has been associated with corresponding one of the live videos is within a first time;
   the presenting includes presenting a first list of tags respectively associated with the live videos; and
   the first list is configured so that a tag associated with a larger number of live videos is prioritized.

2. The system according to claim 1, wherein the managing of the association includes limiting the number of tags in the predetermined state that can be associated with one of the live videos.

3. The system according to claim 1, wherein the managing of the association includes limiting the number of tags that can be associated with one of the live videos within a second time.

4. The system according to claim 1, wherein the managing of the association includes limiting the number of tags that can be associated with one of the live videos by one user within a third time.

5. The system according to claim 1, wherein the managing of the association includes limiting an inputter user who can input a tag based on at least an attribute of each of a plurality of users.

6. The system according to claim 5, wherein the managing of the association includes limiting the inputter user who can input the tag to be associated with the first live video to a plurality of certain users who have a predetermined relationship with a distributor user who distributes the first live video.

7. The system according to claim 1, wherein
   the one or more computer processors further perform receiving a comment input via a viewing screen for viewing a live video;
   the managing of the association includes receiving a tag input via the viewing screen; and
   the viewing screen has a predetermined area in which a first character string input in a first state is recognized as the comment and a second character string input in a second state is recognized as the tag.

8. The system according to claim 1, wherein the presenting includes presenting a second list of live videos based on at least a tag associated with each of the live videos.

9. The system according to claim 8, wherein the presenting includes presenting the second list in which at least one of the tags respectively associated with the live videos is arranged in chronological order together with a corresponding live video.

10. The system according to claim 8, wherein the second list is a list of the live videos each of which is associated with a specific tag.

11. A system comprising one or more computer processors, the one or more computer processors executing machine-readable instructions to perform:
    presenting information on at least one of a plurality of live videos being distributed to a user; and
    managing association of tags with the live videos, wherein
    the managing of the association includes associating a first tag input by a first user viewing a first live video with the first live video;
    the presenting includes:

presenting the information based on at least one of the tags in a predetermined state in which an elapsed time after each of the tags has been associated with corresponding one of the live videos is within a first time, and presenting a second list of live videos based on at least a tag associated with each of the live videos; and the one or more computer processors further perform displaying a predetermined notification regarding a second tag corresponding to a second live video in the second list on a viewing screen for viewing the second live video when a second user starts viewing the second live video via the second list.

12. The system according to claim 11, wherein the predetermined notification includes a notification regarding the second user's start of viewing via the second tag.

13. The system according to claim 11, wherein the predetermined notification includes a notification regarding a third user who associates the second tag with the second live video.

14. The system according to claim 8, wherein the one or more computer processors further perform increasing a value of a predetermined parameter of a third user who associates a second tag corresponding to the second live video in the second list when the second user starts viewing the second live video via the second list.

15. The system according to claim 1, wherein the managing of the association includes automatically posting, to a predetermined SNS, a posting content including the first tag and introducing the first live video when the first tag is associated with the first live video.

16. The system according to claim 1, wherein the managing of the association includes associating the first tag with a distributor user who distributes the first live video in addition to the first live video.

17. A non-transitory computer-readable medium including a program, the program causing one or more computers to execute:

presenting information on at least one of a plurality of live videos being distributed to a user; and managing association of tags with the live videos, wherein the managing of the association includes associating a first tag input by a first user viewing a first live video with the first live video;

the presenting includes presenting the information based on at least one of the tags in a predetermined state in which an elapsed time after each of the tags has been associated with corresponding one of the live videos is within a first time;

the presenting includes presenting a first list of tags respectively associated with the live videos; and the first list is configured so that a tag associated with a larger number of live videos is prioritized.

18. A non-transitory computer-readable medium including a program, the program causing one or more computers to execute:

presenting information on at least one of a plurality of live videos being distributed to a user; and managing association of tags with the live videos, wherein the managing of the association includes associating a first tag input by a first user viewing a first live video with the first live video;

the presenting includes:
presenting the information based on at least one of the tags in a predetermined state in which an elapsed time after each of the tags has been associated with corresponding one of the live videos is within a first time, and presenting a second list of live videos based on at least a tag associated with each of the live videos; and the one or more computers further execute displaying a predetermined notification regarding a second tag corresponding to a second live video in the second list on a viewing screen for viewing the second live video when a second user starts viewing the second live video via the second list.

* * * * *